(12) United States Patent
Utsuno et al.

(10) Patent No.: US 10,374,253 B2
(45) Date of Patent: Aug. 6, 2019

(54) SULFIDE SOLID ELECTROLYTE

(71) Applicant: IDEMITSU KOSAN CO., LTD., Tokyo (JP)

(72) Inventors: Futoshi Utsuno, Sodegaura (JP); Kota Terai, Sodegaura (JP); Takashi Umeki, Sodegaura (JP); Masaru Nakagawa, Sodegaura (JP); Hiroshi Yamaguchi, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 16/239,645

(22) Filed: Jan. 4, 2019

(65) Prior Publication Data

US 2019/0140314 A1    May 9, 2019

Related U.S. Application Data

(63) Continuation of application No. PCT/JP2017/028822, filed on Aug. 8, 2017.

(30) Foreign Application Priority Data

Sep. 12, 2016 (JP) .............................. 2016-177844
Dec. 21, 2016 (JP) .............................. 2016-248018
May 2, 2017 (JP) .............................. 2017-091745

(51) Int. Cl.
    *H01M 10/0525*    (2010.01)
    *H01M 10/0562*    (2010.01)
    (Continued)

(52) U.S. Cl.
    CPC ....... *H01M 10/0562* (2013.01); *H01M 4/136* (2013.01); *H01M 10/058* (2013.01);
    (Continued)

(58) Field of Classification Search
    CPC ...................... H01M 10/0562; H01M 10/0525
    See application file for complete search history.

(56) References Cited

U.S. PATENT DOCUMENTS

2010/0290969 A1    11/2010    Deiseroth et al.
2015/0333368 A1    11/2015    Kato et al.
(Continued)

FOREIGN PATENT DOCUMENTS

JP      2010-540396    12/2010
JP      2015-220013    12/2015
(Continued)

OTHER PUBLICATIONS

Abstracts of the 82nd Annual Meeting of the Electrochemical Society of Japan (2015), (Mar. 15, 2015), 2H08.
(Continued)

*Primary Examiner* — Stewart A Fraser
(74) *Attorney, Agent, or Firm* — Oblon, McClelland, Maier & Neustadt, L.L.P.

(57) ABSTRACT

A sulfide solid electrolyte that contains lithium, phosphorus, sulfur, chlorine and bromine, wherein in powder X-ray diffraction analysis using CuKα rays, it has a diffraction peak A at 2θ=25.2±0.5 deg and a diffraction peak B at 2θ=29.7±0.5 deg, the diffraction peak A and the diffraction peak B satisfy the following formula (A), and a molar ratio of the chlorine to the phosphorus "c (Cl/P)" and a molar ratio of the bromine to the phosphorus "d (Br/P)" satisfies the following formula (1):

$$1.2 < c+d < 1.9 \tag{1}$$

$$0.845 < S_A/S_B < 1.200 \tag{A}$$

where $S_A$ is an area of the diffraction peak A and $S_B$ is an area of the diffraction peak B.

20 Claims, 3 Drawing Sheets

(51) Int. Cl.
- *H01M 10/058* (2010.01)
- *H01M 4/136* (2010.01)
- *H01M 4/58* (2010.01)

(52) U.S. Cl.
CPC ...... *H01M 10/0525* (2013.01); *H01M 4/5815* (2013.01); *H01M 2300/0068* (2013.01)

(56) References Cited

U.S. PATENT DOCUMENTS

| | | | |
|---|---|---|---|
| 2016/0028106 A1* | 1/2016 | Kato | C01B 17/22 429/323 |
| 2016/0156064 A1 | 6/2016 | Miyashita et al. | |
| 2017/0187066 A1* | 6/2017 | Tsujimura | H01M 10/0562 |
| 2017/0222257 A1 | 8/2017 | Miyashita et al. | |
| 2017/0352916 A1 | 12/2017 | Miyashita et al. | |
| 2018/0016185 A1* | 1/2018 | Nakata | C03C 1/02 |
| 2018/0366779 A1* | 12/2018 | Katoh | H01B 1/10 |

FOREIGN PATENT DOCUMENTS

| | | |
|---|---|---|
| JP | 2016-24874 | 2/2016 |
| WO | WO 2015/011937 | 1/2015 |
| WO | WO 2015/012042 | 1/2015 |
| WO | WO 2015/064518 | 5/2015 |
| WO | WO 2016/104702 | 6/2016 |
| WO | 2019/009228 A1 | 1/2019 |

OTHER PUBLICATIONS

"$Li_6PS_5X$: A Class of Crystalline Li-Rich Solids With an Unusually High $Li^+$ Mobility, Deiseroth, et al.", Angew. Chem. Int'l. Edition, vol. 47 (2008), No. 4, p. 755-758.

"Studies of lithium argyrodite solid electrolytes for all-solid-state batteries, Rao et al.", Phys. Status Solidi vol. 208, (2011) No. 8, p. 1804-1807.

"Mechanochemical synthesis of Li-argyrodite $Li_6PS_5X$ (X=Cl, Br, I) as sulfur-based solid electrolytes for all solid state batteries application, Boulineau et al.", Solid State Ionics vol. 221 (2012) p. 1-5.

"Preparation and characterization of highly lithium ion conducting argyrodite-type $Li_6PS_5X$ (X=Cl, Br, I) solid electrolytes, Hayashi et al.", 1 H2-50 of the $94^{th}$ spring annual meeting proceedings, p. 474, (2014) of the Japan Chemical Society (with English abstract).

International Search Report dated Oct. 10, 2017, in PCT/JP2017/028822 filed Aug. 8, 2017.

Translation of the International Preliminary Report of Patentability dated Mar. 12, 2019, in PCT/JP2017/028822 and Written Opinion dated Oct. 10, 2017, in PCT/JP2017/028822.

* cited by examiner

SULFIDE SOLID ELECTROLYTE

TECHNICAL FIELD

The invention relates to a sulfide solid electrolyte.

BACKGROUND ART

In recent years, with rapid spread of information-related equipment or communication equipment such as PCs, video cameras, mobile phones, etc., development of batteries used as the power source thereof is considered to be important. Among these batteries, a lithium ion battery has attracted attention due to its high energy density.

In a lithium ion battery that is currently commercially available, since an electrolyte containing a flammable organic solvent is used, attachment of a safety device that suppresses an increase in temperature at the time of short circuit, and improvement in structure and material in order to avoid occurrence of short circuit is required. On the other hand, it is thought that, since a lithium ion battery obtained by allowing a battery to be totally solid by using a solid electrolyte instead of liquid electrolyte does not use a flammable organic solvent in a battery, simplification of a safety device can be attained, and a production cost can be saved or productivity can be improved.

As the solid electrolyte used in a lithium ion battery, a sulfide solid electrolyte is known. As the crystal structure of a sulfide solid electrolyte, various structures are known. As one of such crystal structures, an argyrodite type crystal structure can be given. Patent Documents 1 to 5 or Non-Patent Documents 1 to 3, etc. disclose an argyrodite type crystal structure comprising one type of a halogen. Further, Non-Patent Documents 4 and 5 report a solid electrolyte having a composition of $Li_6PS_5Cl_{1-x}Br_x$, and disclose an argyrodite type crystal structure comprising two types of halogen. Some of the argyrodite type crystal structures have high lithium ion conductivity. However, further improvement in ionic conductivity is required. In addition, in general, a sulfide solid electrolyte has a problem that there is a possibility that it generates hydrogen sulfide when reacted with moisture contents in air.

RELATED ART DOCUMENTS

Patent Documents

Patent Document 1: JP-T-2010-540396
Patent Document 2: WO2015/011937
Patent Document 3: WO2015/012042
Patent Document 4: JP-A-2016-24874
Patent Document 5: WO2016/104702

Non-Patent Documents

Non-Patent Document 1: Angew. chem Vol. 47 (2008), No. 4, P. 755-758
Non-Patent Document 2: Phys. Status. Solidi Vol. 208 (2011), No. 8, P. 1804-1807
Non-Patent Document 3: Solid State Ionics Vol. 221 (2012) P. 1-5
Non-Patent Document 4: Abstract of the 82nd lecture of the Electrochemical Society of Japan (2015), 2H08
Non-Patent Document 5: P. 474, 1 H2-50 of the 94th spring annual meeting proceedings (2014) of the Japan Chemical Society

SUMMARY OF THE INVENTION

One object of the invention is to provide a novel sulfide solid electrolyte having a further high ionic conductivity.

Further, one object of the invention is to provide a novel sulfide solid electrolyte in which the amount of hydrogen sulfide generated by a reaction with moisture contents in the air is suppressed.

According to one embodiment of the invention, provided is a novel sulfide solid electrolyte that comprises lithium, phosphorus, sulfur, chlorine and bromine, wherein in powder X-ray diffraction analysis using CuKα rays, it has a diffraction peak A at 2θ=25.2±0.5 deg and a diffraction peak B at 2θ=29.7±0.5 deg, the diffraction peak A and the diffraction peak B satisfy the following formula (A), and a molar ratio of the chlorine to the phosphorus "c (Cl/P)" and a molar ratio of the bromine to the phosphorus "d (Br/P)" satisfy the following formula (1):

$$1.2<c+d<1.9 \tag{1}$$

$$0.845<S_A/S_B<1.200 \tag{A}$$

wherein $S_A$ is an area of the diffraction peak A and $S_B$ is an area of the diffraction peak B.

According to one embodiment of the invention, an electrode mix comprising the above-mentioned sulfide solid electrodes and an active material is provided.

According to one embodiment of the invention, a lithium ion battery comprising at least one of the above-mentioned sulfide solid electrode and the above-mentioned electrode mix is provided.

According to one embodiment of the invention, it is possible to provide a sulfide solid electrolyte having a high ionic conductivity.

According to one embodiment of the invention, it is possible to provide a sulfide solid electrolyte in which the amount of hydrogen sulfide generated by reaction with moisture in the air is suppressed.

MODE FOR CARRYING OUT THE INVENTION

Figure 1:
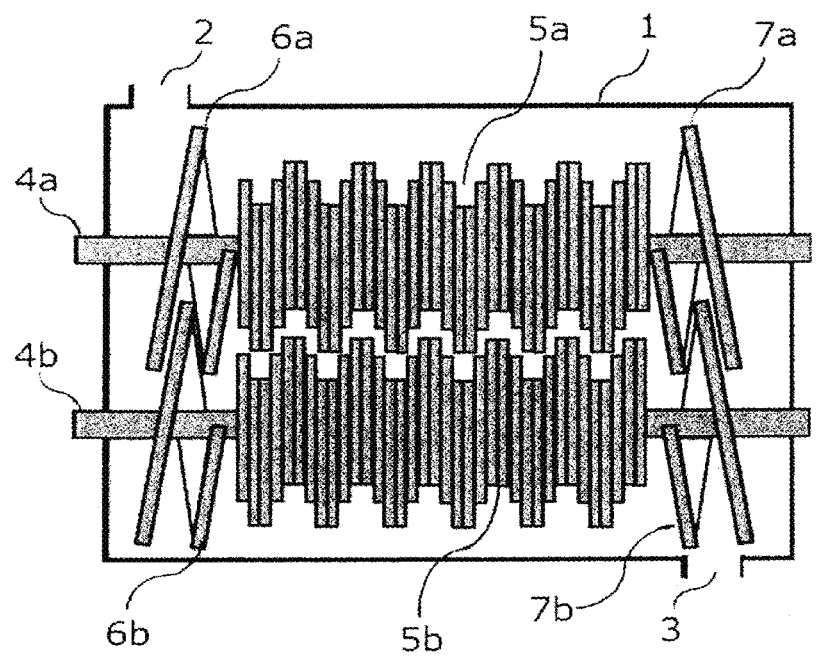
FIG. 1 is a plan view of a cross section of one example of a multi-axial kneader used for production of a sulfide solid electrolyte obtained by cutting at the center of a rotational shaft.

The sulfide solid electrolyte according to one embodiment of the invention comprises lithium (Li), phosphorus (P), sulfur (S), chlorine (Cl) and bromine (Br) as constituent elements, and is characterized in that it has a diffraction peak A at 2θ=25.2±0.5 deg and a diffraction peak B at 2θ=29.7±0.5 deg and the diffraction peak A and the diffraction peak B satisfy the following formula (A):

$$0.845 < S_A/S_B < 1.200 \quad (A)$$

wherein in the formula, $S_A$ is an area of the diffraction peak A and $S_B$ is an area of the diffraction peak B.

The diffraction peak A and the diffraction peak B are peaks derived from an argyrodite type crystal structure. In addition to the diffraction peak A and the diffraction peak B, a diffraction peak derived from an argyrodite type crystal structure may appear at 2θ=15.3±0.5 deg, 17.7±0.5 deg, 31.1±0.5 deg, 44.9±0.5 deg or 47.7±0.5 deg, for example. The sulfide solid electrolyte of this embodiment may have these peaks.

In this embodiment, the position of the diffraction peak is judged to be A±0.5 deg assuming that the median value is A. A is preferably A±0.3 deg. For example, in the case of the above-mentioned diffraction peak of 2θ=25.2±0.5 deg, the median value A is 25.2 deg and is preferably present in a range of 2θ=25.2±0.3 deg. The same can be applied to judgement of all of the other diffraction peak positions in the invention.

By satisfying the above formula (A), the sulfide solid electrolyte of this embodiment has a higher ionic conductivity as compared with the conventional argyrodite type crystal structure-containing solid electrolyte. The above formula (A) means that the area ratio of the diffraction peaks ($S_A/S_B$) is larger than that of the conventional argyrodite type crystal structure-containing solid electrolyte. It is preferred that the area ratio ($S_A/S_B$) be 0.850 or more and 1.150 or less, with 0.860 or more and 1.100 or less being more preferable.

The fact that the area ratio ($S_A/S_B$) is large means that the ratio of a halogen (the total of Cl and Br) occupying a site of the argyrodite type crystal structure is high. Especially, the site occupation ratio of Br is increased as compared with that of the conventional technology. In general, various types of crystal components and amorphous components are present in mixture in a sulfide solid electrolyte. Part of Cl and Br that is incorporated as constituent elements of the sulfide solid electrolyte forms the argyrodite type crystal structure, and the remaining Cl and Br form a crystal structure other than the argyrodite type crystal structure and an amorphous component. It is thought that there is a possibility that the remaining Cl and Br are contained in remaining raw materials. This embodiment is based on a finding that, by increasing a halogen occupying the site in the argyrodite type crystal structure, especially, by increasing the site occupation ratio of Br as compared with that of the conventional technology, the area ratio ($S_A/S_B$) becomes large, whereby the ionic conductivity of the sulfide solid electrolyte is increased.

The argyrodite type crystal structure is a structure in which a $PS_4^{3-}$ structure is a main unit structure of the skeleton and a site in the vicinity of this structure is occupied by S and a halogen (Cl, Br) surrounded by Li.

The area ratio of the X-ray diffraction peak of the crystal structure can be calculated from the coordinates of each element of the crystal structure (see "XRD diffraction handbook", third edition, Rigaku Denki Co., 2000, p. 14-15). A common argyrodite type crystal structure is a crystal structure indicated by a space group F-43M and is shown by No. 216 of the data base of International Tables for Crystallography Volume G: Definition and exchange of crystallographic data (ISBN. 978-1-4020-3138-0). In the crystal structure shown by No. 216, a 4a site and a 4d site are present around the $PS_4$ structure, an element having a large ionic radius tends to occupy the 4a site, and an element having a small ionic radius tends to occupy the 4d site.

In the unit lattice of the argyrodite type crystal structure, there are eight 4a sites and 4d sites in total. For a case in which four Cls and four Ss are arranged in these sites (Case 1), and a case in which four Cls, two Brs and two Ss are arranged in these sites (Case 2), an area ratio of an X-ray diffraction peak was calculated. As a result, in Case 2, as compared with Case 1, while the area of the diffraction peak A (diffraction peak at 2θ=25 deg) becomes broad, only a small change is observed in the area of the diffraction peak B (diffraction peak at 2θ=30 deg). From the above calculation results, it is considered that, due to occupation of the site by Br, the area ratio ($S_A/S_B$) becomes large.

In general, the area ratio and the intensity ratio of the X-ray diffraction peak are proportional to the number of electrons of the element (see "X-ray crystal analysis guide", Shokabo (1983)). It is assumed that, since Cl and S have roughly the same electron number and Br has a larger number of electrons, it is considered that the site occupation ratio of Br in the crystal diffraction plane corresponding to the diffraction peak A is increased. In view of the ionic radius, occupation ratio in the 4a site is especially increased.

Increasing the amount of a halogen occupying the site in the argyrodite type crystal structure means that the amount of S occupying the site in the argyrodite type crystal structure is relatively reduced. A halogen having a valence of −1 has a force weaker to attract Li than S having a valence of −2. Further, the number of Li attracted is small. It is assumed that the density of Li in the vicinity of the site is decreased, and Li tends to move easily, whereby the ionic conductivity of the argyrodite type crystal structure is increased.

When the halogen is Cl alone, the occupation ratio of S increases at the 4a site. By using Br having the equivalent ionic radius to that of S with Cl, the occupation ratio of Br in the 4a site is increased, and as a result, the entire halogen occupation ratio is improved. In addition, even when Cl occupies some 4a sites, Cl at the 4a site is unstable and may be desorbed during a heat treatment. Therefore, it is thought that it is preferable not only to simply increase the halogen occupation ratio but also to occupy a suitable site for a halogen having a suitable ionic radius. In this embodiment, it is assumed that the ionic conductivity is increased since a large amount of two halogens (Cl and Br) appropriately occupy the site in the argyrodite type crystal structure.

In this embodiment, a molar ratio of the chlorine to the phosphorus "c (Cl/P)" and a molar ratio of the bromine to the phosphorus "d (Br/P)" satisfy the following formula (1):

$$1.2 < c+d < 1.9 \quad (1)$$

c+d is a molar ratio of the chlorine and the bromine to the phosphorus. By allowing the c+d to be in the above-mentioned range, the effect of improving the ionic conductivity of the sulfide solid electrolyte is increased. c+d is preferably 1.4 or more and 1.8 or less, with 1.5 or more and 1.7 or less being more preferable.

In the sulfide solid electrolyte according to one embodiment of the invention, a molar ratio of the bromine to the phosphorus "d (Br/P)" is preferably 0.15 or more and 1.6 or less. The molar ratio "d" is further preferably 0.2 or more and 1.2 or less, with 0.4 or more and 1.0 or less being more preferable.

It is preferred that the molar ratio of the chlorine to the phosphorus "c (Cl/P)" and the molar ratio of the bromine to the phosphorus "d (Br/P)" satisfy the following formula (2):

$$0.08 < d/(c+d) < 0.8 \quad (2)$$

d/(c+d) is more preferably 0.15 or more and 0.6 or less, with 0.2 or more and 0.5 or less being further preferable.

Further, it is preferred that the molar ratio of the lithium to the phosphorus "a (Li/P)", the molar ratio of the sulfur to the phosphorus "b (S/P)", the molar ratio of the chlorine to the phosphorus "c (Cl/P)" and the molar ratio of the bromine to the phosphorus "d (Br/P)" satisfy the following formulas (3) to (5):

$$5.0 \leq a \leq 7.5 \quad (3)$$

$$6.5 \leq a+c+d \leq 7.5 \quad (4)$$

$$0.5 \leq a-b \leq 1.5 \quad (5)$$

provided that b>0, c>0 and d>0.

By satisfying the above formulas (3) to (5), the argyrodite type crystal structure tends to be formed easily.

The above formula (3) is preferably $5.0 \leq a \leq 6.8$, with $5.2 \leq a \leq 6.6$ being more preferable.

The above formula (4) is preferably $6.6 \leq a+c+d \leq 7.4$, with $6.7 \leq a+c+d \leq 7.3$ being more preferable.

The above formula (5) is preferably $0.6 \leq a-b \leq 1.3$, with $0.7 \leq a-b \leq 1.3$ being more preferable.

Within a range that does not impart the advantageous effects of the invention, in addition to Li, P, S, Cl and Br mentioned above, the sulfide solid electrolyte of this embodiment may contain Si, Ge, Sn, Pb, B, Al, Ga, As, Sb, Bi, O, Se, Te or the like. The sulfide solid electrolyte may essentially consist only of Li, P, S, Cl and Br. The "essentially consist of Li, P, S, Cl and Br" means that the sulfide solid electrolyte comprises only Li, P, S, Cl and Br, except for inevitably mixed in impurities.

The molar ratio and composition of each element mentioned above is not a molar ratio and composition of raw materials used in production, but a molar ratio and composition in the sulfide solid electrolyte as a formed product. The molar ratio of each element can be controlled by adjusting the content of each element in the raw material.

In the invention, as the molar ratio and composition of each element in the sulfide solid electrolyte, a value measured by an ICP emission spectrometry is used, except for cases where an analysis is difficult. The methods for measurement are described in the Examples.

As for the sulfide solid electrolyte according to one embodiment of the invention, it is preferred that the sulfide solid electrolyte do not have a diffraction peak derived from lithium halide in powdery X-ray diffraction using CuKα rays. If it has a peak derived from lithium halide, it is preferred that the following formula (B) is satisfied:

$$0 < I_C/I_A < 0.08 \quad (B)$$

wherein $I_C$ is an intensity of a diffraction peak of the lithium halide and $I_A$ is an intensity of a diffraction peak at 2θ=25.2±0.5 deg.

The above formula (B) shows that the amount of lithium halide is relatively small as compared with the amount of the argyrodite type crystal structure. Presence of lithium halide means presence of a halogen that does not occupy the site in the argyrodite type crystal structure among all halogens in the sulfide solid electrolyte.

The intensity $I_C$ of the diffraction peak of lithium halide is the intensity of a diffraction peak that appears in a range of 34.0 deg≤2θ≤35.5 deg when the lithium halide is LiCl.

However, if two or more diffraction peaks are present in this range, the intensity is an intensity of a diffraction peak that appears at the highest angle side. In the case of LiBr, $I_C$ is the intensity of a peak that appears within a range of 32.5 deg≤2θ≤33.9 deg. However, if two or more diffraction peaks are present in this range, $I_C$ is the intensity of a peak that appears at the smallest angle side. The reason for such definition is as follows. If a novel crystal structure including a halogen mentioned later is present, a diffraction peak appears at 14.4±0.5 deg and 33.8±0.5 deg. When only one diffraction peak is observed in a range of 32.5 deg≤2θ≤35.5 deg in spite of a fact that a diffraction peak is observed at 14.4±0.5 deg, it is assumed that these diffraction peaks are derived from a novel crystal structure including a halogen, mentioned later. In this case, it is thought that a diffraction peak derived from lithium halide does not appear. When diffraction peaks of LiCl and LiBr are observed, the to is the total of these diffraction peaks.

The formula (B) is more preferably $0 < I_C/I_A < 0.07$, with $0 < I_C/I_A < 0.06$ being further preferable.

It is preferred that in powdery X-ray diffraction using CuKα rays, the sulfide solid electrolyte according to one embodiment of the invention do not have a diffraction peak at 2θ=14.4±0.5 deg and 33.8±0.5 deg. If it has a diffraction peak, it is preferred that the following formula (C) be satisfied.

$$0 < I_D/I_A < 0.09 \quad (C)$$

wherein $I_D$ is an intensity of a diffraction peak at 2θ=14.4±0.5 deg and $I_A$ is an intensity of a diffraction peak at 2θ=25.2±0.5 deg.

It is assumed that the crystal having a diffraction peak at 2θ=14.4±0.5 deg and 33.8±0.5 deg is novel, and is a structure that partially contains a halogen. The above formula (C) means that the amount of the novel crystal structure is relatively small as compared with the argyrodite type crystal structure. Presence of the novel crystal structure means presence of a halogen that does not occupy the site in the argyrodite type crystal structure among all halogens in the sulfide solid electrolyte.

It is more preferable that the formula (C) is $0 < I_D/I_A < 0.06$, with $0 < I_C/I_D < 0.05$ being further preferable.

In the sulfide solid electrolyte according to one embodiment of the invention, it is preferred that the lattice constant of the argyrodite type crystal structure be 9.800 Å or more and 9.920 Å or less.

The fact that the lattice constant of the argyrodite type crystal structure is small implies that the amount of chlorine and bromine contained in the crystal structure is large. When it is less than 9.800 Å, it is considered that bromine is difficult to be incorporated into the crystal structure.

The lattice constant of the argyrodite type crystal structure is calculated from the XRD pattern obtained by X-ray diffraction measurement (XRD) by analyzing whole pattern fitting (WPF) by using crystal structure analysis software. Details of the measurement are shown in the Examples.

In the sulfide solid electrolyte according to one embodiment of the invention, in the solid $^{31}$P-NMR measurement, it is preferred that the solid electrolyte have a peak at each of 81.5 to 82.5 ppm (hereinafter, referred to as the first region), 83.2 to 84.7 ppm (hereinafter, referred to as the second region), 85.2 to 86.7 ppm (hereinafter, referred to as the third region) and 87.2 to 89.4 ppm (hereinafter, referred to as the fourth region), and it is preferred that the ratio of the sum of the area of the peak at 81.5 to 82.5 ppm and 83.2 to 84.7 ppm relative to the total of all peaks that appear within a range of 78 to 92 ppm be 60% or more. It is assumed that the fact that the ratio of the sum of the area of the first peak and the second peak is high means that the sum of the amount of chlorine and the amount of bromine incorporated into the argyrodite type crystal structure is large. As a result, the ionic conductivity of the solid electrolyte is increased.

Meanwhile, the peak in the first region is referred to as the first peak ($P_1$), the peak in the second region is referred to as the second peak ($P_2$), the peak in the third region is referred to as the third peak ($P_3$) and the peak in the fourth region is referred to as the fourth peak ($P_4$).

Presence of a peak in a region means that a peak having a peak top in the region is present or a peak is present in this region at the time of separation by the non-linear least squares method.

Due to the difference in the distribution of free chlorine (Cl) and free sulfur (S) around the $PS_4^{3-}$ structure in the crystal, the argyrodite type crystal structure ($Li_6PS_5Cl$) in which the halogen is chlorine, in its solid $^{31}$P-NMR spectrum, resonance lines of phosphorus differing in chemical shift are observed in an overlapped manner (Non-Patent Document 1). Based on these findings, the inventors examined the solid $^{31}$P-NMR spectrum of the argyrodite type crystal structure in which the ratio of a free halogen and a free sulfur is different. As a result, it was found that the NMR signal observed in the region of 78 to 92 ppm can be separated into four kinds of $PS_4^{3-}$ structure peaks with different distribution states of surrounding free S and free halogen. Further, it was found that among the four kinds of peaks, if the ratio of areas of peaks closer to the high magnetic field side (the sum of the first peak and the second peak mentioned above) is high, the ionic conductivity of the solid electrolyte is high. It is assumed that the first peak and the second peak mentioned above are derived from a $PS_4^{3-}$ structure in which many of surrounding free elements are Cl or Br. On the other hand, it is assumed that the third peak and the fourth peak mentioned above are derived from a $PS_4^{3-}$ structure in which many of surrounding free elements are S.

The sulfide solid electrolyte according to one embodiment of the invention can be produced by a production method comprising a step, for example, in which a mixture of raw materials is reacted by applying a mechanical stress to prepare an intermediate and a step in which the intermediate is heat-treated for crystallization.

As the raw materials used, two or more compounds or simple substances containing, as a whole, elements to be contained as essential components in a sulfide solid electrolyte i.e. lithium, phosphorus, sulfur, chlorine and bromine are used in combination.

Examples of the raw material containing lithium include lithium compounds such as lithium sulfide ($Li_2S$), lithium oxide ($Li_2O$), lithium carbonate ($Li_2CO_3$), lithium metal simple substance, and the like. Among them, a lithium compound is preferable, with lithium sulfide being more preferable.

The lithium sulfide mentioned above can be used without specific restrictions. However, one having a high purity is preferable. Lithium sulfide can be produced by a method described in JP-A-H07-330312, JP-A-H09-283156, JP-A-2010-163356, JP-A-2011-84438, or the like.

Specifically, lithium hydroxide and hydrogen sulfide are reacted in a hydrocarbon-based organic solvent at 70° C. to 300° C. to form lithium hydrosulfide, and subsequently, hydrogen sulfide is removed from this reaction liquid, thereby to produce lithium sulfide (JP-A-2010-163356).

Further, by reacting lithium hydroxide and hydrogen sulfide in an aqueous solvent at 10° C. to 100° C. to form lithium hydrosulfide, and subsequently, hydrogen sulfide is removed from this reaction liquid, thereby to produce lithium sulfide (JP-A-2011-84438).

Examples of the raw material containing phosphorus include phosphorus compounds such as phosphorus sulfide such as phosphorus trisulfide ($P_2S_3$) and phosphorus pentasulfide ($P_2S_5$), and sodium phosphate ($Na_3PO_4$), phosphorus simple substance or the like. Among these, phosphorus sulfide is preferable, with phosphorus pentasulfide ($P_2S_5$) being more preferable. As for the phosphorus compounds and the phosphorus simple substance, any can be used without specific restrictions as long as they are commercially available.

As the raw material containing chlorine and/or bromine, it is preferred that the raw material contain a halogen compound represented by the following formula (6), for example.

$$M_l X_m \qquad (6)$$

In the formula (6), M is sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi) or those in which an oxygen element or a sulfur element are bonded to these elements, and lithium (Li) or phosphorus (P) is preferable with lithium (Li) being more preferable.

X is chlorine (Cl) or bromine (Br).

I is an integer of 1 or 2 and m is an integer of 1 to 10. When m is 2 to 10, that is, when plural Xs are present, the Xs may be the same or different. For example, in the case of $SiBrCl_3$ mentioned later, m is 4, and X is formed of different elements, i.e. Br and Cl.

As the halogen compound represented by the formula (6), NaCl, NaBr, LiCl, LiBr, $BCl_3$, $BBr_3$, $AlBr_3$, $AlCl_3$, $SiCl_4$, $SiCl_3$, $Si_2Cl_6$, $SiBr_4$, $SiBrCl_3$, $SBir_2Cl_2$, $PCl_3$, $PCl_5$, $POCl_3$, $PBr_3$, $POBr_3$, $P_2Cl_4$, $SCl_2$, $S_2Cl_2$, $S_2Br_2$, $GeCl_4$, $GeBr_4$, $GeCl_2$, $GeBr_2$, $AsCl_3$, $AsBr_3$, $SeCl_2$, $SeCl_4$, $Se_2Br_2$, $SeBr_4$, $SnCl_4$, $SnBr_4$, $SnCl_2$, $SnBr_2$, $SbCl_3$, $SbBr_3$, $SbCl_5$, $TeCl_2$, $TeCl_4$, $TeBr_2$, $TeBr_4$, $PbCl_4$, $PbCl_2$, $PbBr_2$, $BiCl_3$, $BiBr_3$ or the like can be given.

Among these, lithium chloride (LiCl), lithium bromide (LiBr), phosphorus pentachloride ($PCl_5$), phosphorus trichloride ($PCl_3$), phosphorus pentabromide ($PBr_5$), phosphorus tribromide ($PBr_3$) or the like can preferably be given. Among these, LiCl, LiBr or $PBr_3$ are preferable, with LiCl and LiBr being further preferable.

As the halogen compound, one of the above-mentioned compounds may be used singly, or two or more may be used in combination. That is, at least one of the above-mentioned compounds can be used.

In one embodiment of the invention, it is preferred that the raw materials contain a lithium compound, a phosphorus compound and a halogen compound. It is preferred that at least one of the lithium compound and the phosphorus compound comprises a sulfur element. Combination of $Li_2S$, phosphorus sulfide, LiCl and LiBr is more preferable, with combination of $Li_2S$, $P_2S_5$, LiCl and LiBr being further preferable.

When $Li_2S$, $P_2S_5$, LiCl and LiBr are used as the raw material of the sulfide solid electrolyte, the molar ratio of the raw materials incorporated can be $Li_2S:P_2S_5$:total of LiCl and LiBr=30 to 60:10 to 25:15 to 50.

In one embodiment of the invention, a mechanical stress is applied to the above-mentioned raw materials to allow them to react, thereby allowing them to be an intermediate. Here, the "applying a mechanical strength" means that shear force, impact strength, etc. are mechanically applied. As means for applying a mechanical stress, a pulverizer such as a planetary ball mill, a vibration mill and a rolling mill, a kneader, etc. can be given.

In the conventional technology (for example, Patent Document 2, etc.), pulverization and mixing are carried out to such an extent that the crystallinity of the raw material powder can be maintained. On the other hand, in this embodiment, it is preferable that the raw materials be subjected to a mechanical stress and reacted, thereby to obtain an intermediate containing a glass component. That is, by a mechanical stress higher than that used in the conventional technology, pulverization and mixing are conducted to such a level that at least part of the raw material powder cannot maintain crystallinity. As a result, in the stage of an intermediate, a $PS_4$ structure that is a basic skeleton of the argyrodite type crystal structure can be generated and a halogen can be highly dispersed. It is assumed that a halogen that is highly dispersed in an intermediate is efficiently introduced into a site of the argyrodite type crystal structure by heat treatment. As a result, it is assumed that the sulfide solid electrolyte of this embodiment exhibits high ionic conductivity.

Presence of a glass (amorphous) component in an intermediate can be confirmed by the presence of a broad peak (hallo pattern) derived from an amorphous component in an XRD measurement.

As the condition of pulverization and mixing, for example, when a planetary ball mill is used as a pulverizer, the rotation speed may be from several tens to several hundreds of revolution/minute and may be treated for 0.5 hour to 100 hours. More specifically, in the case of the planetary ball mill (Model No. P-7, manufactured by Fritsch Co.) used in the Examples, the rotation speed of the planetary ball mill is preferably 350 rpm or more and 400 rpm or less, more preferably 360 rpm or more and 380 rpm or less.

For example, when a ball made of zirconia is used as the pulverization media, its diameter is preferably 0.2 to 20 mm.

The intermediate prepared by pulverizing and mixing is heat-treated. The heat treatment temperature is preferably 350 to 480° C., further preferably 360 to 460° C., with 380 to 450° C. being more preferable. By allowing the heat treatment temperature to be slightly slower than that used in conventional technologies, a halogen contained in the argyrodite type crystal structure tends to be increased. As for the reason, it is assumed that, if the heat treatment temperature is high, a halogen tends to be removed easily from a site in the argyrodite type crystal structure.

Although the atmosphere of the heat treatment is not particularly limited, it is preferred that the atmosphere be not a hydrogen sulfide stream but an inert gas atmosphere such as nitrogen or argon. It is assumed that by suppressing substitution of free halogen in the crystal structure with sulfur, the amount of halogen in the crystal structure can be increased, and as a result, the ion conductivity of the obtained sulfide solid electrolyte is improved.

When a kneader is used as the means for applying the above-mentioned mechanical stress, the kneader is not particularly restricted. However, in respect of easiness in production, a multi-axial kneader having two or more shafts is preferable.

As the multi-axial kneader, for example, one provided with a casing, two or more rotational shafts that are arranged such that they penetrate the casing in the longitudinal direction, and a paddle (screw) is provided along the axial direction, and a raw material supply port at one end in the longitudinal direction of the casing and a discharge port at the other end can be given. No other configurations are not particularly restricted as long as two or more rotational movements are mutually acted to generate a mechanical stress. By rotating the two or more rotational shafts in which two or more paddles are provided, two or more rotational movements are mutually acted such that a mechanical stress can be formed, whereby the raw materials can be reacted by the mechanical stress that is applied to the raw materials moving from the supply port to the discharge port along the rotational shaft.

Figure 2:
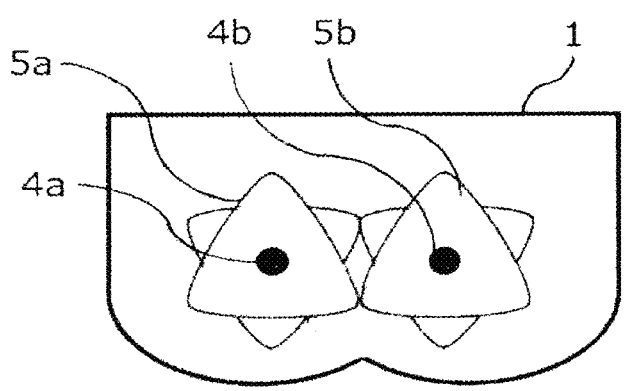
FIG. 2 is a plan view of a cross section of a part where a paddle of the rotational shaft is provided of one example of the multi-axial kneader used for production of a sulfide solid electrode obtained by cutting perpendicularly to a rotational shaft.

One preferable example of the multi-axial kneader that can be used in one embodiment of the invention will be explained with reference to FIG. 1 and FIG. 2. FIG. 1 is a plan view of a cross section of the multi-axial kneader obtained by cutting at the center of the rotational shaft, and FIG. 2 is a plan view of a cross section of a part where a paddle of the rotational shaft is provided of the multi-axial kneader obtained by cutting perpendicularly to a rotational shaft.

The multi-axial kneader shown in FIG. 1 is a bi-axial kneader provided with a casing 1 provided with a supply port 2 at its one end and a discharge port 3 at the other end, two rotational shafts 4a and 4b arranged such that they penetrate in the longitudinal direction of the casing 1. In each of the rotational shafts 4a and 4b, a paddle 5a and a paddle 5b are provided. The raw materials enter the casing 1 through the supply port 2, and are reacted by application of a mechanical stress in the paddle 5a and the paddle 5b. The resulting reaction product is discharged from a discharge port 3.

The number of the rotational shaft 4 is not particularly restricted, as long as it is two or more. In respect of multiplicity of use, two to four rotational shafts are preferable, and two rotational shafts are more preferable. Further, the rotational shaft 4 may preferably be parallel shafts that are in parallel with each other.

The paddle 5 is provided on the rotational shaft in order to knead the raw materials, and is also called a "screw". No specific restrictions are imposed on the cross sectional shape. In addition to an approximate triangle shown in FIG. 2 in which each side of an equilateral triangle is uniformly projected arc-shaped, circular, elliptical, substantially quadrangular and the like can be given, and a shape in which a notch is provided in a part of these shapes as a base can also be given.

In the case of providing a plurality of paddles, as shown in FIG. 2, each paddle may be provided on the rotating shaft at different angles. In addition, when trying to obtain more kneading effects, the meshing type paddle may be selected.

Although the number of rotations of the paddle is not particularly limited, it is preferably 40 to 300 rpm, more preferably 40 to 250 rpm, and further preferably 40 to 200 rpm.

In the multi-axial kneader, a screw 6 may be provided on the supply port 2 side as shown in FIG. 1 so that the raw materials are supplied to the kneader without any delay. A reverse screw 7 may be provided on the discharge port 3 side as shown in FIG. 1 so that the reactant obtained via the paddle 5 do not retain in the casing.

As a multi-axial kneader, a commercially available kneading machine can also be used. Examples of commercially available multi-axial kneading machines include KRC kneader (manufactured by Kurimoto Co., Ltd.) and the like.

The kneading time of the raw materials varies depending on the type of the element constituting the sulfide solid electrolyte to be obtained, the composition ratio, and the temperature during the reaction, and may be adjusted as appropriate, preferably 5 minutes to 50 hours, more preferably 10 minutes to 15 hours, and further preferably 1 to 12 hours.

The kneading temperature of the raw materials varies depending on the type of the element constituting the sulfide solid electrolyte to be obtained, the composition ratio, and the time during the reaction, so it may be appropriately adjusted, preferably 0° C. or more, more preferably 25° C. or more, more preferably 100° C. or more, and most preferably 250° C. or more. When the temperature is high, the argyrodite type crystal structure tends to be precipitated more easily at the time of kneading. If it is 350° C. or higher, it is considered that the argyrodite type crystal structure is more likely to be precipitated. The upper limit of the kneading temperature may be such that the generated argyrodite type crystal structure is not decomposed, that is, it is less than 500° C.

The intermediate discharged from the discharge port of the multi-axial kneader may be supplied from the supply port again in accordance with the degree of the progress of the reaction, and a reaction may further proceed. The degree of the progress of the reaction can be grasped from an increase or decrease of the peak derived from the raw materials of the resulting intermediate.

By subjecting the intermediate obtained by kneading to a heat treatment, whereby a sulfide solid electrolyte is obtained. The heat treatment temperature is preferably 350 to 480° C., further preferably 360 to 460° C., with 380 to 450° C. being more preferable. The atmosphere of the heat treatment is not particularly restricted, but is preferably an inert gas atmosphere such as nitrogen and argon, not a stream of hydrogen sulfide.

The sulfide solid electrolyte of the invention can be used in a solid electrolyte layer, a positive electrode, a negative electrode, etc. of a lithium ion secondary battery.

[Electrode Mix]

The electrode mix according to one embodiment of the invention comprises the sulfide solid electrolyte of the invention mentioned above and an active material, or is produced from the sulfide solid electrolyte of the invention. When a negative electrode active material is used as an active material, the electrode mix becomes a negative electrode mix. On the other hand, when a positive electrode active material is used, it becomes a positive electrode mix.

Negative Electrode Mix

A negative electrode mix is obtained by incorporating a negative electrode material to the sulfide solid electrolyte of the invention.

As the negative electrode active material, a carbon material, a metal material, etc. can be used. A composite material formed of two or more of these can also be used. Further, a negative electrode material that will be developed in the future can be used.

It is preferred that the negative active material have electron conductivity.

The carbon materials include graphite (e.g., artificial graphite), graphite carbon fiber, resin calcined carbon, pyrolytic vapor-grown carbon, coke, mesocarbon microbeads (MCMB), burned carbon of furfuryl alcohol resin, polyacene, pitch type carbon fibers, vapor grown carbon fibers, natural graphite, non-graphitizable carbon and the like can be given.

Examples of the metallic material include a simple metal substance, alloys, and metal compounds. As the simple metal substance, metal silicon, metal tin, metal lithium, metal indium, metal aluminum can be mentioned. As the alloy, an alloy containing at least one of silicon, tin, lithium, indium and aluminum can be mentioned. As the metal compound, a metal oxide can be mentioned. The metal oxide is, for example, silicon oxide, tin oxide, aluminum oxide.

The blending ratio of the negative electrode active material and the solid electrolyte is preferably the negative electrode active material:the solid electrolyte=95 wt %:5 wt % to 5 wt %:95 wt %, more preferably 90 wt %:10 wt % to 10 wt %:90 wt %, and further preferably 85 wt %:15 wt % to 15 wt %:85 wt %.

When the content of the negative electrode active material in the negative electrode mix is too small, the electric capacity becomes small. In addition, when the negative electrode active material has electron conductivity and does not contain a conductive assistant or contains only a small amount of a conductive assistant, it is considered that electron conductivity (electron conduction path) in the negative electrode decreases and the rate characteristics may be lowered. Or, the utilization factor of the negative electrode active material is decreased, whereby the electric capacity may be decreased. On the other hand, if the content of the negative electrode active material in the negative electrode mix is too large, it is considered that the ionic conductivity (ion conduction path) in the negative electrode may be lowered to decrease the rate characteristics, or the utilization factor of the negative electrode active material may be lowered to decrease the electronic capacity.

The negative electrode mix may further contain a conductive assistant.

When the negative electrode active material has low electronic conductivity, it is preferable to add a conductive assistant. The conductive assistant is sufficient if it has conductivity, and its electron conductivity is preferably $1 \times 10^3$ S/cm or more, more preferably $1 \times 10^5$ S/cm or more.

As specific examples of preferable conductive assistant, a carbon material, a material including at least one element selected from nickel, copper, aluminum, indium, silver, cobalt, magnesium, lithium, chromium, gold, ruthenium, platinum, beryllium, iridium, molybdenum, niobium, osmium, rhodium, tungsten, and zinc, more preferably a carbon simple substance having high conductivity, a carbon material other than simple substance of carbon; simple substances, mixtures or compounds including nickel, copper, silver, cobalt, magnesium, lithium, ruthenium, gold, platinum, niobium, osmium or rhodium, can be given.

Specific examples of the carbon material include carbon black such as Ketjen black, acetylene black, denka black, thermal black, and channel black; graphite, carbon fiber, activated carbon and the like, which may be used alone or in combination of two or more. Among them, acetylene black, denka black, and Ketjen black having high electronic conductivity are preferable.

In the case where the negative electrode mix contains a conductive assistant, the content of the conductive assistant in the composite material is preferably 1 to 40% by mass, more preferably 2 to 20% by mass. If the content of the conductive assistant is too small, it is considered that the electronic conductivity of the negative electrode may be lowered to deteriorate the rate characteristics, and the utilization factor of the negative electrode active material may be decreased to lower the electric capacity. On the other hand, if the content of the conductive assistant is too large, the amount of the negative electrode active material and/or the amount of the solid electrolyte decreases. It is presumed that the electric capacity decreases as the amount of the negative electrode active material decreases. Further, if the amount of the solid electrolyte decreases, it is considered that the ionic conductivity of the negative electrode may be lowered, thereby to lower the rate characteristics, or the utilization factor of the negative electrode active material may be lowered to decrease the electric capacity.

In order to allow the negative electrode active material and the solid electrolyte to be bonded tightly, a binder may be further included.

As the binder, fluorine-containing resins such as polytetrafluoroethylene (PTFE), polyvinylidene fluoride (PVDF), fluorine rubber and the like, thermoplastic resins such as polypropylene and polyethylene, ethylene-propylene-diene rubber (EPDM), sulfonated EPDM, natural butyl rubber (NBR) and the like can be used alone or as a mixture of two or more kinds. It is also possible to use an aqueous dispersion of a cellulose type or SBR, which are aqueous binders, or the like.

The negative electrode mix can be produced by mixing a solid electrolyte and a negative electrode active material, and an arbitrary conductive assistant and/or a binder.

There are no particular restrictions on the mixing method, but it is possible to use, for example, dry mixing by mixing using a mortar, a ball mill, a bead mill, a jet mill, a planetary ball mill, a vibrating ball mill, a sand mill, a cutter mill; and wet mixing in which, after dispersing the raw materials in an organic solvent, mixing is conducted with a mortar, a ball mill, a bead mill, a planetary ball mill, a vibration ball mill, a sand mill, and a film mix, followed by removal of the solvent. Among them, wet mixing is preferable in order not to destroy the negative electrode active material particles.

Positive Electrode Mix

A positive electrode mix can be obtained by blending a positive electrode active material with the solid electrolyte of the invention.

A positive electrode active material is a material into which a lithium ion can be inserted and from which a lithium ion can be removed, and one that is known as the positive electrode active material in the field of a battery can be used. Further, a positive electrode active material that will be developed in the future can be used.

Examples of the positive electrode active material include metal oxides, sulfides, and the like. Sulfides include metal sulfides and non-metal sulfides.

The metal oxide is, for example, a transition metal oxide. Specifically, $V_2O_5$, $V_6O_{13}$, $LiCoO_2$, $LiNiO_2$, $LiMnO_2$, $LiMn_2O_4$, $Li(Ni_aCo_bMn_c)O_2$ (here, $0<a<1$, $0<b<1$, $0<c<1$, $a+b+c=1$), $LiNi_{1-Y}CO_YO_2$, $LiCo_{1-Y}Mn_YO_2$, $LiNi_{1-Y}Mn_YO_2$ (here, $0\leq Y<1$), $Li(Ni_aCo_bMn_c)O_4$ ($0<a<2$, $0<b<2$, $0<c<2$, $a+b+c=2$), $LiMn_{2-Z}NiZ_0O_4$, $LiMn_{2-Z}Co_ZO_4$ (here, $0<Z<2$), $LiCoPO_4$, $LiFePO_4$, $CuO$, $Li(Ni_aCo_bAl_c)O_2$ (here, $0<a<1$, $0<b<1$, $0<c<1$, $a+b+c=1$) or the like can be given.

Examples of the metal sulfide include titanium sulfide ($TiS_2$), molybdenum sulfide ($MoS_2$), iron sulfide (FeS, $FeS_2$), copper sulfide (CuS), nickel sulfide ($Ni_3S_2$) and the like.

In addition to these, bismuth oxide ($Bi_2O_3$), bismuth lead ($Bi_2Pb_2O_5$) and the like can be mentioned as the metal oxide.

Examples of nonmetallic sulfides include organic disulfide compounds and carbon sulfide compounds.

In addition to those mentioned above, niobium selenide ($NbSe_3$), metal indium, sulfur can also be used as the positive electrode active material.

The positive electrode mix may further comprise a conductive assistant.

The conductive assistant is the same as that of the negative electrode mix.

The blending ratio of the solid electrode and the positive electrode active material of the positive electrode mix, the content of the conductive assistant and the method for producing the positive electrode mix are the same as those of the above-mentioned negative electrode mix.

[Lithium Ion Battery]

The lithium ion battery according to one embodiment of the invention comprises at least one of the above-mentioned sulfide solid electrolyte and the electrode mix of the invention, or is produced from at least one of the sulfide solid electrolyte and the electrode mix.

The configuration of the lithium ion battery is not particularly restricted, but it has a structure in which a negative electrode layer, an electrolyte layer and a positive electrode layer are stacked in this order. Hereinbelow, an explanation will be made on each layer of the lithium ion battery.

(1) Negative Electrode Layer

The negative electrode layer is preferably a layer that is produced from the negative electrode mix of the invention.

Alternatively, the negative electrode layer is a layer that comprises the negative electrode mix of the invention.

The thickness of the negative electrode layer is preferably 100 nm or more and 5 mm or less, more preferably 1 µm or more and 3 mm or less, with 5 µm or more and 1 mm or less being further preferable.

The negative electrode layer can be produced by a known method. For example, it can be produced by a coating method, an electrostatic method (electrostatic spray method, electrostatic screen method, etc.).

(2) Electrolyte Layer

The electrolyte layer is a layer that comprises a solid electrolyte or a layer produced from a solid electrolyte. Although no specific restrictions are imposed on the solid electrolyte, the solid electrolyte is preferably the sulfide solid electrolyte according to the invention.

The electrolyte layer may consist only of the solid electrolyte, and may further comprise a binder. As the binder, the same binder as that used in the negative electrode mix of the invention can be used.

It is preferred that the thickness of the electrolyte layer be 0.001 mm or more and 1 mm or less.

The solid electrolyte of the electrolyte layer may be fused. Fusion means that part of the solid electrolyte particles are dissolved and the dissolved part is integrated with other solid electrolyte particles. Further, the electrolyte layer may be a plate-like body of the solid electrolyte, and as for the plate-like body, there may be cases where part or all of the solid electrolyte particles are dissolved to form a plate-like body.

The electrolyte layer can be produced by a known method. For example, it can be produced by a known method. For example, it can be produced by a coating method or an electrostatic method (electrostatic spray method, electrostatic screen method, etc.).

(3) Positive Electrode Layer

The positive electrode layer is a layer that comprises a positive electrode active material. Preferably, the positive electrode layer is a layer that comprises the positive electrode mix of the invention or a layer that is produced from the positive electrode mix of the invention.

It is preferred that the thickness of the positive electrode layer be 0.01 mm or more and 10 mm or less.

The positive electrode layer can be produced by a known method. For example, it can be produced by a coating method, an electrostatic method (electrostatic spray method, electrostatic screen method, etc.).

(4) Current Collector

The lithium ion battery of this embodiment preferably further comprises a current collector. For example, a negative electrode current collector is provided on the side opposite to the electrolyte layer side of the negative electrode layer and a positive electrode current collector is provided on the side opposite to the electrolyte layer side of the positive electrode layer.

As the current collector, a plate-like body or a foil-like body, etc. formed of copper, magnesium, stainless steel, titanium, iron, cobalt, nickel, zinc, aluminum, germanium, indium, lithium or an alloy thereof, or the like.

The lithium ion battery of this embodiment can be produced by laminating and bonding the above-mentioned elements. As the method for bonding, a method in which the elements are stacked, pressurized and crimpled, a method in which the elements are pressurized by passing through the two rolls (roll-to-roll method) or the like can be given.

Bonding may be conducted with an active material having an ionic conductivity or an adhesive material that does not impair ionic conductivity being present on the bonding surface.

In the bonding, heat sealing may be conducted within a range that the crystal structure of the solid electrolyte is not changed.

The lithium ion battery of this embodiment can also be produced by forming the elements mentioned above in sequence. It can be produced by a known method. For example, it can be produced by a coating method, an electrostatic method (electrostatic spray method, electrostatic screen method, etc.).

EXAMPLES

Hereinbelow, the invention will be explained in more detail in accordance with the Examples.

The evaluation method is as follows.

(1) Measurement of Ionic Conductivity and Electron Conductivity

The sulfide solid electrolyte prepared in each example was filled in a tablet molding machine and a pressure of 407 MPa (press indication value 22 MPa) was applied by using a mini press machine to obtain a molded body. As the electrode, a carbon was put on the both sides of the molded body, and a pressure was applied again by a tablet molding machine, whereby a molded body for measurement (diameter: about 10 mm, thickness: 0.1 to 0.2 cm) was prepared. For this molded body, an ionic conductivity was measured by AC impedance measurement. The numerical value at 25° C. was adopted as the ionic conductivity value.

In the ionic conductivity measuring method used in this example, when the ionic conductivity is less than $1.0 \times 10^{-6}$ S/cm, ionic conductivity was determined to be unmeasurable since it cannot be measured accurately.

Further, the electron conductivity of this molded body was measured by direct current electric measurement. As for the value of the electron conductivity, a numerical value at 25° C. was adopted. When the electron conductivity when a voltage of 5 V was applied was less than $1.0 \times 10^{-6}$ S/cm, the electron conductivity was determined to be unmeasurable.

(2) X-Ray Diffraction (XRD) Measurement

A circular pellet having a diameter of 10 mm and a height of 0.1 to 0.3 cm was molded from the powder of the sulfide solid electrolyte produced in each example to prepare a sample. This sample was measured without touching the air using an air-tight holder for XRD. The 2θ position of the diffraction peak was determined by the centroid method using an XRD analysis program JADE.

Measurement was conducted under the following conditions using a powder X-ray diffractometer SmartLab manufactured by Rigaku Corporation.
Tube voltage: 45 kV
Tube current: 200 mA
X-ray wavelength: CuKα rays (1.5418 Å)
Optical system: Parallel beam system
Slit configuration: Solar slit 5°, incident slit: 1 mm, light receiving slit: 1 mm
Detector: Scintillation counter
Measurement range: 2θ=10-60 deg
Step width, scan speed: 0.02 deg, 1 deg/min In the analysis of the peak position for confirming the existence of the crystal structure from the measurement result, the peak position was obtained by drawing the baseline by cubic approximation using the XRD analysis program JADE.

The intensity and the area of the diffraction peaks, i.e. a diffraction peak at 2θ=25.2±0.5 deg (diffraction peak A) and 2θ=29.1±0.5 deg (diffraction peak B) were analyzed by the following procedures, whereby the area ratio was calculated.

In an XRD pattern, the maximum peak position of 2θ=23 to 27 deg was obtained, and the intensity (height) of the peak top thereof was taken as the intensity $I_A$ of the diffraction peak. The integrated value of the actual measured intensity of 41 points which are within ±0.4 degrees from the maximum peak position was taken as the area $S_A$ of the diffraction peak A. Similarly, the maximum peak position of 2θ=28 to 32 deg was obtained, and the integrated value of the actually measured intensity of 41 points which are within ±0.4 deg from the maximum peak position was taken as the area $S_B$ of the diffraction peak B. From $S_A$ and $S_B$, the area ratio ($S_A/S_B$) was calculated.

As for the intensity $I_C$ of the diffraction peak of lithium halide, when lithium halide is LiCl, a peak at 2θ=34.0 to 35.5 deg is specified, and the intensity of the peak top was taken as the intensity $I_C$ of the diffraction peak. If two or more peaks appeared in this range, the intensity of the peak specified at the highest angle side was used. When lithium halide is LiBr, a peak at 2θ=32.5 to 33.9 deg was specified, and the intensity of the peak top was taken as the intensity $I_C$ of the diffraction peak. If two or more peaks appeared in this range, the intensity of the peak specified at the lowest angle side was used.

Further, a peak at 2θ=14.0 to 15.0 deg was specified, and the intensity of the peak top was taken as the intensity $I_D$ of the diffraction peak.

(3) ICP Measurement

Powders of the sulfide solid electrolyte prepared in each example were weighed and collected in a vial bottle in an argon atmosphere. A KOH alkaline aqueous solution was placed in the vial bottle, and the sample was dissolved while paying attention to the collection of the sulfur content, and the solution was appropriately diluted, thereby to prepare a measurement solution. This solution was measured with a Paschen Runge type ICP-OES apparatus (SPECTRO ARCOS manufactured by SPECTRO), and the composition was determined.

A calibration solution for Li, P and S was prepared by using a 1000 mg/L standard solution for ICP measurement, and a calibration solution for Cl and Br was prepared by using a 1000 mg/L standard solution for ion chromatography.

Two measurement solutions were prepared for each sample, five measurements were performed for each measurement solution, and an average value was calculated. The composition was determined by the average of the measurement values of the two measurement solutions.

(4) Lattice Constant of the Argyrodite Type Crystal Structure

The XRD was measured under the same conditions as those mentioned in (2) above. The obtained XRD pattern was analyzed by the whole pattern fitting (WPF) using crystal structure analysis software JADE ver 6 manufactured by MDI, and each crystal component contained in the XRD pattern was specified, whereby the lattice constant of each component was calculated.

Removal of Background of the XRD Pattern

In an XRD pattern after the measurement, scattered light derived from a device or signals derived from an air-tight holder are present on the low angle side. In order to remove such signals, in conformity with the XRD pattern, a baseline attenuated from the low angle side was calculated by 3D approximation.

Identification of Peak Components

For each component contained in the sample, a pattern calculated from the structure information on the inorganic crystal structure database (ICSD) was superimposed on the XRD pattern, whereby the peak component was identified. The structure information used is shown in Table 1.

TABLE 1

| Component | ICSD | Crystal system | Lattice constant (Å) |
|---|---|---|---|
| Lithium sulfide | #657596 | Cubic system Fm-3m (225) | a = 5.723 |
| Lithium chloride | #418525 | Cubic system Fm-3m (225) | a = 5.146 |
| Lithium bromide | #27982 | Cubic system Fm-3m (225) | a = 5.500 |
| Argyrodite (With Cl) | #418490 | Cubic system F-43m (216) | a = 9.859 |
| Argyrodite (Without Cl) | #421130 | Cubic system F-43m (216) | a = 9.9926 |
| Argyrodite (With Br) | #418488 | Cubic system F-43m (216) | a = 9.988 |

WPF Analysis

The main parameter settings for the WPF analysis are shown below.

X-ray wavelength: CuKα rays (λ=1.54184 Å)

Fitting parameter: The peak shape was approximated as a symmetrical peak. Temperature factors were excluded from fitting. When crystals such as $Li_2S$ remain as fine peaks, the fitting may not converge in some cases. In such a case, structures other than the argyrodite type crystals and the lithium halide crystals were excluded from the fitting objects, and the half width and the intensity were manually input to conduct fitting, thereby to calculate the lattice constant of the argyrodite type crystal.

Regarding the lattice constant, it was confirmed whether the peak position of the crystal structure to be evaluated was in good agreement with the fitting results. Regarding the area ratio, it was a measure of the adequacy of the results that the R value was 10% or less. As for the R value serving as a measure of the accuracy of the fitting, the R value may become high when a large number of unknown peaks is present or amorphous peaks remain.

(5) Solid $^{31}$P-NMR Measurement

Approximately 60 mg of the powder sample was filled in an NMR sample tube, and solid $^{31}$P-NMR spectrum was obtained under the following apparatus and conditions.

Apparatus: ECZ 400 R apparatus (manufactured by JEOL Ltd.)
Observation nucleus: $^{31}$P
Observation frequency: 161.944 MHz
Measurement temperature: Room temperature
Pulse sequence: Single pulse (using 90° pulse)
90° pulse width: 3.8µ
Waiting time after FID measurement until the next pulse application: 300 s
Rotational speed of magic angle rotation: 12 kHz
Number of integrations: 16
Measurement range: 250 ppm to −150 ppm In measurement of the solid $^{31}$P-NMR spectrum, the chemical shift was obtained by using $(NH_4)_2HPO_4$ (chemical shift 1.33 ppm) as an external reference.

NMR signals in the range of 78 to 92 ppm of the solid $^{31}$P-NMR spectrum were separated into Gauss function or Pseudo-Voigt function (linear sum of Gauss function and Lorentz function) by the nonlinear least squares method. In the above range, in addition to a peak derived from the argyrodite type crystal structure containing chlorine and bromine, a peak derived from $Li_7PS_6$ may appear at 88.5 to 90.5 ppm, and a peak derived from β crystals of $Li_3PS_4$ may appear at 86 to 87.6 ppm in an overlapped manner. Therefore, wave separation was conducted by different methods for two cases, i.e. a case where these two peaks are not observed and a case where these two peaks are observed.

(5-1) A Case where a Peak Derived from $Li_7PS_6$ and β Crystals of $Li_3PS_4$ is not Observed NMR signals in a range of 78 to 92 ppm were separated into four Gaussian functions or Pseudo-Voigt functions (linear sum of Gaussian function and Lorentz function) in a range of the position and half width shown in Table 2 by the nonlinear least squares method. The area ratio (%) of each peak was calculated from the respective areas $S_1$ to $S_4$ of the peaks of the obtained A to C and the total $S_{all}$ (=$S_1$+$S_2$+$S_3$+$S_4$) thereof.

TABLE 2

| | Chemical shift (ppm) | Half width (Hz) | Function used for separation | Area |
|---|---|---|---|---|
| Fourth peak ($P_4$) | 87.2-89.4 | 300-600 | Pseudo-Voigt | $S_4$ |
| Third peak ($P_3$) | 85.2-86.7 | 150-800 | Gauss | $S_3$ |
| Second peak ($P_2$) | 83.2-84.7 | 150-800 | Gauss | $S_2$ |
| First peak ($P_1$) | 81.5-82.5 | 150-500 | Pseudo-Voigt | $S_1$ |

(5-2) A Case where a Peak Derived from $Li_7PS_6$ or β Crystals of $Li_3PS_4$ is Observed As shown in Table 3, in addition to the four peaks derived from the argyrodite type crystal structure containing chlorine, the NMR signals of 78 to 92 ppm were separated by the non-linear least square method by using peak derived from $Li_7PS_6$ (peak I) or $Li_3PS_4$ (peak II). The area ratio (%) of each peak was calculated from the areas $S_1$ to $S_4$ of the peaks A to C obtained, the areas $b_1$ and $b_2$ of the peaks I and II, and the total of these $S_{all+b}$(=$S_1$+$S_2$+$S_3$+$S_4$+$b_1$+$b_2$).

TABLE 3

| | Chemical shift (ppm) | Half width (Hz) | Function used for separation | Area |
|---|---|---|---|---|
| Fourth peak ($P_4$) | 87.2-89.4 | 300-600 | Pseudo-Voigt | $S_4$ |
| Third peak ($P_3$) | 85.2-86.7 | 150-800 | Gauss | $S_3$ |
| Second peak ($P_2$) | 83.2-84.7 | 150-800 | Gauss | $S_2$ |
| First peak ($P_1$) | 81.5-82.5 | 150-500 | Pseudo-Voigt | $S_1$ |

TABLE 3-continued

| | Chemical shift (ppm) | Half width (Hz) | Function used for separation | Area |
|---|---|---|---|---|
| Peak I | 88.5-90.5 | 150-800 | Pseudo-Voigt | $b_1$ |
| Peak II | 86.0-87.6 | 150-500 | Pseudo-Voigt | $b_2$ |

Production Example 1

(Production of Lithium Sulfide ($Li_2S$))

In a 500 mL-separable flask equipped with a stirrer, 200 g of LiOH anhydride (manufactured by Honjo Chemical Co., Ltd.) dried under an inert gas was charged. The temperature was raised under a nitrogen stream, and the internal temperature was maintained at 200° C. The nitrogen gas was switched to hydrogen sulfide gas ($H_2S$) (Sumitomo Seika), the flow rate was allowed to be 500 mL/min, and LiOH anhydride was reacted with hydrogen sulfide.

Moisture generated by the reaction was condensed by a condenser and recovered. When the reaction was carried out for 6 hours, 144 mL of water was recovered. The reaction was continued further for 3 hours, but no water generation was observed.

The product powder was recovered and purity and XRD were measured. As a result, the purity was 98.5%, and in XRD, the peak pattern of $Li_2S$ was confirmed.

Example 1

$Li_2S$ (purity: 98.5%) produced on Production Example 1, phosphorus pentasulfide ($P_2S_5$ manufactured by Thermophos International, purity: 99.9% or more), lithium chloride (LiCl manufactured by Sigma Aldrich Co., purity: 99%) and lithium bromide (LiBr manufactured by Sigma Aldrich Co., purity: 99%) were used as starting materials (hereinafter, the purity of each starting material was the same in all Examples). The raw materials were mixed such that the molar ratio of $Li_2S$, $P_2S_5$, LiCl and LiBr ($Li_2S$:$P_2S_5$:LiCl:LiBr) became 1.9:0.5:1.0:0.6. Specifically, 0.447 g of $Li_2S$, 0.569 g, 0.217 g and 0.267 g were mixed to obtain a raw material mixture.

The raw material mixture and 30 g of zirconia balls having a diameter of 10 mm were placed in a zirconia pot (45 mL) of a planetary ball mill (manufactured by Fritsch Co. Ltd., model No. P-7) and completely sealed. The inside of the pot was allowed to be an argon atmosphere. The raw material mixture was treated (mechanical milling) for 15 hours with a planetary ball mill (number of revolutions: 370 rpm), whereby glassy powder (intermediate) was obtained.

Approximately 1.5 g of the above-mentioned intermediate powder was packed in a Tammann tube (PT2, manufactured by Tokyo Glass Instruments Co., Ltd.) in a glove box under an argon atmosphere, and the mouth of the Tammann tube was closed with a quartz wool, and the container was further sealed with a SUS container to prevent intrusion of air. Thereafter, the sealed container was set in an electric furnace (FUW243PA, manufactured by AdvanTech Co., Ltd.) and heat-treated at a rate of 2.5° C./min from room temperature to 430° C. (increased to 430° C. in about 3 hours), maintained at 430° C. for 8 hours, followed by slow cooling to obtain a sulfide solid electrolyte.

The ionic conductivity (σ) of the sulfide solid electrolyte was 13.0 mS/cm.

Figure 3:
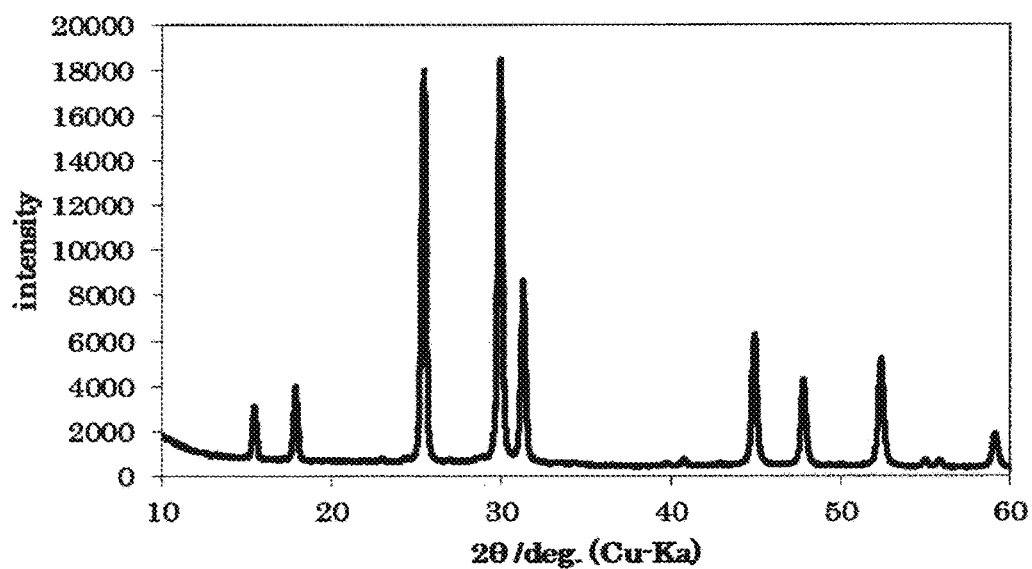
FIG. 3 is an X-ray diffraction pattern of the sulfide solid electrolyte obtained in Example 1.

An XRD pattern of the sulfide solid electrolyte is shown in FIG. 3. A peak derived from the argyrodite type crystal structure was observed at 2θ=15.5, 17.9, 25.4, 29.9, 31.3, 44.9, 47.8, 52.4 and 59.1 deg.

An ICP analysis was conducted for the sulfide solid electrolyte, and the molar ratio of each element was measured. As a result, the molar ratio a (Li/P) was 5.35, the molar ratio b (S/P) was 4.33, the molar ratio c (Cl/P) was 1.102, and the molar ratio d (Br/P) was 0.62.

The blending and production conditions of the raw materials are shown in Table 4. The molar ratio of each element in the raw material and the molar ratio of each element in the sulfide solid electrolyte are shown in Table 5. For the sulfide solid electrolyte, the areas and the area ratio of the diffraction peaks A and B in the XRD pattern and ionic conductivity a are shown in Table 6. The intensity of the diffraction peak and the intensity ratio of the diffraction peak in the XRD pattern of the sulfide solid electrolyte are shown in Table 7. The lattice constant and the area ratio of the $^{31}$P-NMR of the sulfide solid electrolyte are shown in Table 8.

TABLE 4

| | Amount of raw materials blended (g) | | | | | Number of Revolutions | | Amount of raw materials blended (g) Temperature | | |
|---|---|---|---|---|---|---|---|---|---|---|
| | $Li_2S$ | $P_2S_5$ | LiCl | LiBr | Apparatus | (rpm) | Time (h) | (° C.) | Time (h) | Atmosphere |
| Ex. 1 | 0.447 | 0.569 | 0.217 | 0.267 | Ball mill | 370 | 15 | 430 | 8 | Ar |
| Comp. Ex. 1 | 0.447 | 0.569 | 0.217 | 0.267 | Manual mixing | — | — | 430 | 8 | Ar |
| Ex. 2 | 7.75 | 9.87 | 3.76 | 4.63 | Twin-screw kneader | — | — | 430 | 8 | Ar |
| Ex. 3 | 0.421 | 0.537 | 0.123 | 0.419 | Ball mill | 370 | 15 | 430 | 8 | Ar |
| Ex. 4 | 0.434 | 0.552 | 0.169 | 0.345 | Ball mill | 370 | 15 | 430 | 8 | Ar |
| Ex. 5 | 0.461 | 0.587 | 0.269 | 0.183 | Ball mill | 370 | 15 | 430 | 8 | Ar |
| Ex. 6 | 0.476 | 0.606 | 0.324 | 0.095 | Ball mill | 370 | 15 | 430 | 8 | Ar |
| Ex. 7 | 0.479 | 0.610 | 0.335 | 0.076 | Ball mill | 370 | 15 | 430 | 8 | Ar |
| Comp. Ex. 2 | 0.479 | 0.610 | 0.335 | 0.076 | Ball mill | 370 | 15 | 500 | 8 | Ar |
| Comp. Ex. 3 | 0.581 | 0.611 | 0.252 | 0.057 | Ball mill | 370 | 15 | 430 | 8 | Ar |
| Comp. Ex. 4 | 0.593 | 0.574 | 0.109 | 0.224 | Ball mill | 370 | 15 | 430 | 8 | Ar |

TABLE 5

| | Composition ratio of raw materials | | | | | Elemental ratio of sulfide solid electrolyte | | | | |
|---|---|---|---|---|---|---|---|---|---|---|
| | Li/P | Li/P | X*/P | Cl/P | Br/P | Li/P | Li/P | X*/P | Cl/P | Br/P |
| Ex. 1 | 5.4 | 4.4 | 1.6 | 1.0 | 0.6 | 5.35 | 4.33 | 1.64 | 1.02 | 0.62 |
| Comp. Ex. 1 | 5.4 | 4.4 | 1.6 | 1.0 | 0.6 | 5.30 | 4.20 | 1.60 | 1.01 | 0.59 |
| Ex. 2 | 5.4 | 4.4 | 1.6 | 1.0 | 0.6 | 5.41 | 4.39 | 1.65 | 1.04 | 0.61 |
| Ex. 3 | 5.4 | 4.4 | 1.6 | 0.6 | 1.0 | 5.40 | 4.42 | 1.60 | 0.61 | 0.99 |
| Ex. 4 | 5.4 | 4.4 | 1.6 | 0.8 | 0.8 | 5.40 | 4.41 | 1.61 | 0.82 | 0.79 |
| Ex. 5 | 5.4 | 4.4 | 1.6 | 1.2 | 0.4 | 5.40 | 4.38 | 1.62 | 1.21 | 0.41 |
| Ex. 6 | 5.4 | 4.4 | 1.6 | 1.4 | 0.2 | 5.40 | 4.35 | 1.64 | 1.42 | 0.22 |
| Ex. 7 | 5.4 | 4.4 | 1.6 | 1.44 | 0.16 | 5.40 | 4.39 | 1.63 | 1.45 | 0.18 |
| Comp. Ex. 2 | 5.4 | 4.4 | 1.6 | 1.44 | 0.16 | 5.40 | 4.31 | 1.61 | 1.44 | 0.17 |
| Comp. Ex. 3 | 5.8 | 4.8 | 1.2 | 1.08 | 0.12 | 5.80 | 4.70 | 1.23 | 1.08 | 0.15 |
| Comp. Ex. 4 | 6.0 | 5.0 | 1.0 | 0.5 | 0.5 | 6.00 | 5.05 | 1.02 | 0.51 | 0.51 |

*X is the total of Cl and Br.

TABLE 6

| | Diffraction peak area and area ratio | | | Ionic conductivity |
|---|---|---|---|---|
| | $S_A$ | $S_B$ | $S_A/S_B$ | (mS/cm) |
| Ex. 1 | 311496 | 332792 | 0.936 | 13.0 |
| Comp. Ex. 1 | 355834 | 435918 | 0.816 | 3.7 |
| Ex. 2 | 322317 | 345101 | 0.934 | 13.5 |
| Ex. 3 | 391148 | 386904 | 1.011 | 12.3 |
| Ex. 4 | 350789 | 358147 | 0.979 | 12.8 |
| Ex. 5 | 266841 | 301813 | 0.884 | 12.1 |
| Ex. 6 | 275176 | 317723 | 0.866 | 12.1 |
| Ex. 7 | 257130 | 302562 | 0.850 | 10.5 |
| Comp. Ex. 2 | 190978 | 248258 | 0.769 | 6.3 |
| Comp. Ex. 3 | 265408 | 314342 | 0.844 | 6.0 |
| Comp. Ex. 4 | 424826 | 497569 | 0.927 | 4.9 |

In the table, $S_A$ is an area of the diffraction peak A (2θ = 25.2 ± 0.5 deg) and $S_B$ is an area of the diffraction peak B (29.7 ± 0.5 deg).

TABLE 7

| | Diffraction peak intensity | | | Intensity ratio | |
|---|---|---|---|---|---|
| | $I_A$ | $I_C$ | $I_D$ | $I_C/I_A$ | $I_D/I_A$ |
| Ex. 1 | 17994 | 640 | ND | 0.036 | — |
| Comp. Ex. 1 | 17835 | 801 | ND | 0.045 | — |
| Ex. 2 | 20687 | 968 | ND | 0.044 | — |
| Ex. 3 | 24086 | 1076 | ND | 0.045 | — |
| Ex. 4 | 21821 | ND | ND | — | — |
| Ex. 5 | 16476 | 648 | ND | 0.039 | — |
| Ex. 6 | 15855 | 627 | ND | 0.042 | — |
| Ex. 7 | 15855 | 787 | ND | 0.050 | — |
| Comp. Ex. 2 | 12315 | 1521 | 1218 | 0.124 | 0.099 |
| Comp. Ex. 3 | 16135 | 686 | ND | 0.043 | — |
| Comp. Ex. 4 | 25031 | 626 | ND | 0.025 | — |

TABLE 8

| | Lattice constant | Peak area ratio of P-NMR (%) | | | | |
|---|---|---|---|---|---|---|
| | (Å) | P1 | P2 | P3 | P4 | P1 + P2 |
| Ex. 1 | 9.877 | 19.9 | 46.9 | 18.5 | 14.7 | 66.8 |
| Comp. Ex. 1 | 9.923 | — | — | — | — | — |
| Ex. 2 | 9.876 | 20.8 | 44.5 | 20.7 | 13.9 | 65.4 |
| Ex. 3 | 9.918 | 18.6 | 44.4 | 21.3 | 15.7 | 63.0 |
| Ex. 4 | 9.900 | 18.5 | 43.8 | 29.8 | 7.9 | 62.3 |
| Ex. 5 | 9.881 | 25.0 | 39.9 | 27.9 | 7.2 | 64.9 |
| Ex. 6 | 9.820 | 40.8 | 34.7 | 19.4 | 5.1 | 75.5 |
| Ex. 7 | 9.826 | 39.9 | 36.8 | 18.9 | 4.4 | 76.7 |
| Comp. Ex. 2 | 9.884 | 8.2 | 29.8 | 29.7 | 32.4 | 38.0 |
| Comp. Ex. 3 | 9.880 | 28.1 | 24.0 | 25.6 | 22.3 | 52.1 |
| Comp. Ex. 4 | 9.915 | 9.2 | 22.0 | 40.3 | 28.5 | 31.2 |

Comparative Example 1

The same raw materials as in Example 1 was placed in a Schlenk bottle and shaken by hands to mix. The obtained raw material mixture was heat-treated at 430° C. for 8 hours in the same manner as in Example 1 to obtain a sulfide solid electrolyte.

The sulfide solid electrolyte was evaluated in the same manner as in Example 1. The results are shown in Tables 5 to 8.

In Comparative Example 1, it is assumed that, since mixing of the raw materials before the heat treatment was not sufficient, halogen was not dispersed by the heat treatment, and as a result, incorporation of a halogen into the site of the argyrodite crystal structure became insufficient.

Example 2

In Example 2, a Man-screw kneader was used instead of the planetary ball mill in Example 1 for the preparation of an intermediate. Kneading by using the twin screw kneader was specifically conducted as follows.

A feeder (manufactured by Aisin Nanotechnologies Co., Ltd., microfeeder) and a twin-screw kneading extruder (manufactured by Kuritomo Ltd., KRC kneader; paddle diameter σ 8 mm) were installed in a glove box. A mixture of 3.76 g of LiCl, 4.63 g of LiBr, 7.75 g of $Li_2S$ and 9.87 g of $P_2S_5$ was fed at a constant speed from a supply port, and kneading was conducted at a revolution number of 150 rpm at a temperature of 250° C. (measured with a thermometer at the outer surface of the casing of the twin-screw kneading extruder). The powder was discharged from the kneader outlet in about 120 minutes. The discharged powder was returned to the supply port again and kneading was repeated 5 times. The reaction time was about 10 hours in total.

The resulting intermediate was heat-treated at 430° C. for 8 hours in the same manner as in Example 1, by which a sulfide solid electrolyte was obtained.

The resulting sulfide solid electrolyte was evaluated in the same manner as in Example 1. The results are shown in Tables 5 to 8.

Since the twin-screw kneading extruder used for mixing the raw materials is a device that can mix the materials to a significantly high degree; it is assumed that constituent elements were highly dispersed in the intermediate. It may be assumed that the ionic conductivity was improved as a result.

Examples 3 to 7 and Comparative Examples 2 to 4

Sulfide solid electrolytes were prepared and evaluated in the same manner as in Example 1, except that the raw material composition was changed as shown in Table 4, The results are shown in Tables 5 to 8.

In Comparative Example 2, it is considered that a halogen which had occupied the site in the crystal structure was removed due to a high heat treatment temperature. Cl present in the 4a site or Br present in the 4d site are easily removed from the site.

Figure 4:
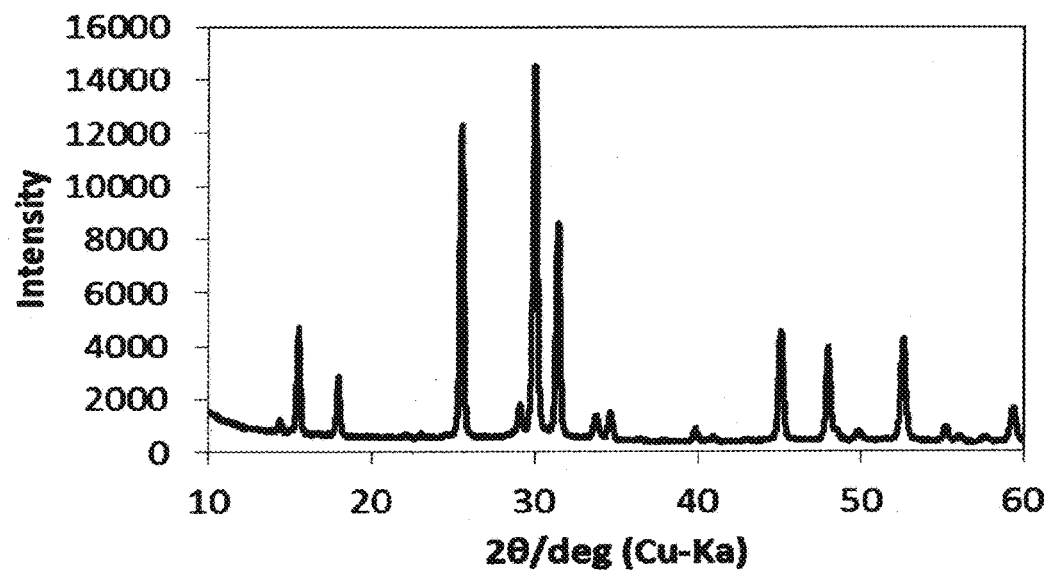
FIG. 4 is an X-ray diffraction pattern of the sulfide solid electrolyte obtained in Comparative Example 2.

An XRD pattern of the sulfide solid electrolyte prepared in Comparative Example 2 is shown in FIG. 4.

Since the crystals of lithium halide and novel crystals having diffraction peaks at $2\theta=14.4\pm0.5$ deg and $33.8\pm0.5$ deg are present, it is assumed that part of Cl or Br that had occupied the site of the argyrodite crystal structure was removed and these crystals were formed.

As a result of an XRD measurement of the sulfide solid electrolyte obtained in each example, a peak derived from the argyrodite crystal structure was observed.

Examples 8 to 12 and Comparative Example 5

Sulfide solid electrolytes were prepared and evaluated in the same manner as in Example 1, except that blending of the raw materials and production conditions were changed as shown in Table 9. The results are shown in Tables 10 to 12. As a result of an XRD measurement of the sulfide solid electrolyte obtained in each example, a peak derived from the argyrodite crystal structure was observed.

TABLE 9

| | Amount of raw materials blended (g) | | | | MM treatment conditions | | Heat treatment conditions | | |
|---|---|---|---|---|---|---|---|---|---|
| | | | | | Number of revolutions | Time | | Temperature | Time |
| | $Li_2S$ | $P_2S_5$ | LiCl | LiBr | (rpm) | (H) | Atmosphere | (° C.) | (H) |
| Ex. 8 | 0.476 | 0.606 | 0.324 | 0.095 | 370 | 48 | Ar | 440 | 4 |
| Ex. 9 | 0.461 | 0.587 | 0.269 | 0.183 | 370 | 48 | Ar | 430 | 4 |
| Ex. 10 | 0.447 | 0.569 | 0.217 | 0.267 | 370 | 48 | Ar | 420 | 4 |
| Ex. 11 | 0.434 | 0.552 | 0.169 | 0.345 | 370 | 48 | Ar | 430 | 4 |
| Ex. 12 | 0.421 | 0.537 | 0.123 | 0.419 | 370 | 48 | Ar | 430 | 4 |
| Ex. 13 | 0.436 | 0.569 | 0.228 | 0.267 | 370 | 48 | $H_2S$ | 500 | 4 |
| Ex. 14 | 2.980 | 3.794 | 1.447 | 1.779 | — | — | Ar | 430 | 4 |
| Ex. 15 | 2.980 | 3.794 | 1.447 | 1.779 | — | — | Ar | 430 | 48 |
| Comp. Ex. 5 | 0.614 | 0.595 | 0.166 | 0.125 | 370 | 48 | Ar | 500 | 10 |

TABLE 10

| | Composition ratio of raw materials | | | | | Elemental ratio of sulfide solid electrolyte | | | | |
|---|---|---|---|---|---|---|---|---|---|---|
| | Li/P | Li/P | X*/P | Cl/P | Br/P | Li/P | Li/P | X*/P | Cl/P | Br/P |
| Ex. 8 | 5.4 | 4.4 | 1.6 | 1.40 | 0.20 | 5.40 | 4.40 | 1.592 | 1.39 | 0.20 |
| Ex. 9 | 5.4 | 4.4 | 1.6 | 1.20 | 0.40 | 5.40 | 4.40 | 1.61 | 1.20 | 0.41 |
| Ex. 10 | 5.4 | 4.4 | 1.6 | 1.00 | 0.60 | 5.40 | 4.40 | 1.61 | 1.01 | 0.60 |
| Ex. 11 | 5.3 | 4.3 | 1.6 | 0.80 | 0.80 | 5.30 | 4.30 | 1.60 | 0.79 | 0.81 |
| Ex. 12 | 5.4 | 4.4 | 1.6 | 0.60 | 1.00 | 5.40 | 4.40 | 1.60 | 0.60 | 1.00 |
| Ex. 13 | 5.4 | 4.4 | 1.7 | 1.05 | 0.60 | 5.35 | 4.40 | 1.64 | 1.04 | 0.60 |
| Ex. 14 | 5.4 | 4.4 | 1.6 | 1.00 | 0.60 | 5.40 | 4.40 | 1.61 | 1.00 | 0.61 |
| Ex. 15 | 5.4 | 4.4 | 1.6 | 1.00 | 0.60 | 5.40 | 4.40 | 1.59 | 0.99 | 0.60 |
| Comp. Ex. 5 | 6.0 | 5.0 | 1.0 | 0.75 | 0.25 | 6.00 | 4.90 | 1.04 | 0.75 | 0.29 |

*X is the total of Cl and Br.

TABLE 11

|  | Diffraction peak area and area ratio | | | Ionic conductivity (mS/cm) |
|---|---|---|---|---|
|  | $S_A$ | $S_B$ | $S_A/S_B$ |  |
| Ex. 8 | 286065 | 311612 | 0.918 | 11.5 |
| Ex. 9 | 277622 | 301813 | 0.920 | 12.5 |
| Ex. 10 | 298354 | 310616 | 0.961 | 13.0 |
| Ex. 11 | 374902 | 401553 | 0.934 | 9.1 |
| Ex. 12 | 362284 | 366129 | 0.989 | 8.8 |
| Ex. 13 | 311222 | 352218 | 0.884 | 11.8 |
| Ex. 14 | 340817 | 369344 | 0.923 | 10.5 |
| Ex. 15 | 320708 | 348913 | 0.919 | 12.1 |
| Comp. Ex. 5 | 429022 | 503469 | 0.852 | 5.1 |

TABLE 12

|  | Lattice constant (Å) | Peak area ratio of P-NMR (%) | | | | |
|---|---|---|---|---|---|---|
|  |  | P1 | P2 | P3 | P4 | P1 + P2 |
| Ex. 8 | 9.825 | 39.2 | 36.3 | 20.4 | 4.2 | 75.5 |
| Ex. 9 | 9.857 | 24.3 | 41.3 | 29.0 | 5.4 | 65.6 |
| Ex. 10 | 9.874 | 40.6 | 33.3 | 17.2 | 8.9 | 73.9 |
| Ex. 11 | 9.905 | 26.3 | 48.9 | 15.1 | 9.7 | 75.2 |
| Ex. 12 | 9.917 | 18.6 | 44.3 | 21.6 | 15.5 | 62.9 |
| Ex. 13 | 9.863 | 27.9 | 38.4 | 19.8 | 13.8 | 66.4 |
| Ex. 14 | 9.881 | 20.5 | 44.9 | 20.1 | 14.5 | 65.4 |
| Ex. 15 | 9.877 | 24.6 | 45.6 | 17.7 | 12.1 | 70.2 |
| Comp. Ex. 5 | 9.921 | 24.2 | 34.6 | 36.0 | 5.2 | 58.8 |

Example 13

An intermediate was prepared in the same manner as in Example 1, except that the raw material composition and the production conditions were changed as shown in Table 9.

In a glove box in an atmosphere of argon, about 1.5 g of powder of the intermediate was filled in a glass tube provided with sealing function. In order to prevent intrusion of air, the front end of the glass tube was sealed with a dedicated jig. Thereafter, the glass tube was set in an electric furnace. The dedicated jig was inserted into a joint in the electric furnace, and was connected with a glass circulation tube. A heat treatment was conducted while circulating hydrogen sulfide at a flow rate of 0.5 L/min. Specifically, the temperature was elevated from room temperature to 500° C. at a rate of 3° C./min, and retained at 500° C. for 4 hours. Thereafter, the glass tube was gradually cooled, by which a sulfide solid electrolyte was obtained.

The resulting solid electrolyte was evaluated in the same manner as in Example 1. The results are shown in Tables 10 to 12. The sulfide solid electrolyte obtained in Example 13 also had an electron conductivity of less than $10^{-6}$ S/cm. As a result of an XRD measurement, a peak derived from the argyrodite crystal structure was observed.

Example 14

In the same manner as in Example 2, kneading by using a twin-screw kneader was conducted for preparation of an intermediate. The kneading by using a twin-screw kneader was specifically conducted in the same manner as in Example 2, except that a mixture of 1.447 g of LiCl, 1.779 g of LiBr, 2.980 g of Li$_2$S, and 3.794 g of P$_2$S$_5$ was supplied at a constant speed from a supply part by a feeder, by which an intermediate was obtained.

The resulting intermediate was heat-treated at 430° C. for 4 hours, by which a sulfide solid electrolyte was obtained.

The results of evaluation of the resulting sulfide solid electrolyte are shown in Tables 10 to 12.

The sulfide solid electrolyte obtained in Example 14 had an electron conductivity of less than $10^{-6}$ S/cm. As a result of an XRD measurement, a peak derived from the argyrodite crystal structure was observed.

Example 15

The sulfide solid electrolyte was prepared and evaluated in the same manner as in Example 14, except that the preparation conditions were changed as shown in Table 9. The results are shown in Tables 10 to 12.

The sulfide solid electrolyte obtained in Example 15 had an electron conductivity of less than $10^{-6}$ S/cm. As a result of an XRD measurement, a peak derived from the argyrodite crystal structure was observed.

[Amount of Hydrogen Sulfide Generated from Sulfide Solid Electrolyte]

Figure 5:
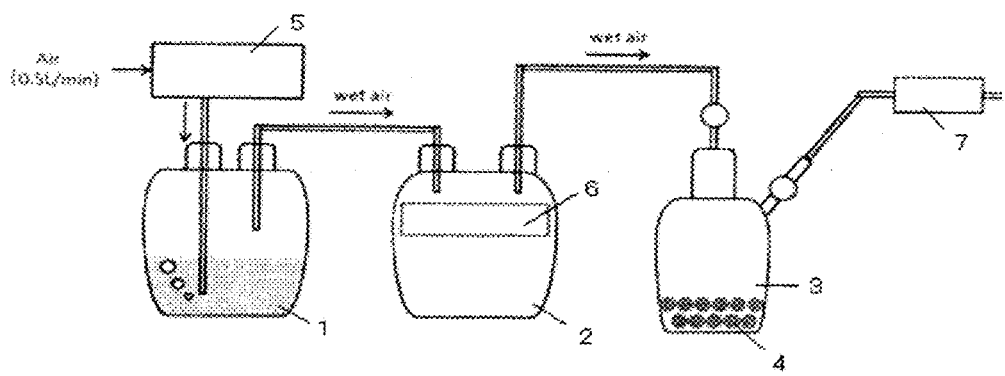
FIG. 5 is an explanatory view of an apparatus used for evaluation of the generation of hydrogen sulfide of the sulfide solid electrolyte.

The amount of hydrogen sulfide generated from the sulfide solid electrolytes prepared in Example 10 and Comparative Example 4 was evaluated by using the apparatus shown in FIG. 5. This apparatus comprises a flask 1 for humidifying air, a flask 2 equipped with a temperature/hygrometer 6 for measuring the temperature and humidity of humidified air, a Schlenk bottle 3 for charging the measurement sample 4, and a hydrogen sulfide measuring device 7 for measuring the concentration of hydrogen sulfide contained in humidified air are connected in this order through a pipe. The evaluation procedure is as follows.

About 0.1 g of powder sample prepared by sufficiently pulverizing the sample in a nitrogen glow box at a dew point of −80° C. was weighed and put in the 100 ml-Schlenk bottle 3, and the bottle was sealed (numerical reference 4 in FIG. 5).

Subsequently, air was flown into the flask 1 at 500 mL/min. The flow rate of air was measured with a flowmeter 5. Air was passed through water in the flask 1 and humidified. Subsequently, humidified air was flown into the flask 2, and the temperature and humidity of the air were measured. Immediately after the start of distribution the temperature of the air was 25° C. and the humidity was 80 to 90%. Thereafter, humidified air was caused to flow through the Schlenk bottle 3 and brought into contact with the measurement sample 4. Humidified air circulated in the Schlenk bottle 3 was passed through a hydrogen sulfide measuring device 7 (Model 3000 RS manufactured by AMI), and the amount of hydrogen sulfide contained in the humidified air was measured. The measurement time was set to be from immediately after air circulation to 1 hour after circulation. The amount of hydrogen sulfide was recorded at intervals of 15 seconds.

From the total amount of hydrogen sulfide observed in 2 hours, the hydrogen sulfide generation amount (mg/g) per 1 g of the sample was calculated. As a result, the amount of the generated hydrogen sulfide was 26 mg/g for the sulfide solid electrolyte of Example 10 and was 64 mL/g for the sulfide solid electrolyte of Comparative Example 4.

[Lithium Ion Battery]

Lithium ion batteries were produced by using the sulfide solid electrolytes obtained in Example 13 and Comparative Example 1, and rate characteristics were evaluated.

(A) Production of Lithium Ion Battery 50 mg of the sulfide solid electrolyte obtained in Example 13 or Comparative Example 1 was respectively put in a stainless steel mold having a diameter of 10 mm and flattened so that the layer thickness of the electrolyte layer became uniform, and then, a pressure of 185 MPa was applied from the upper surface of the electrolyte layer by means of a hydraulic press machine, and pressure molding was conducted.

As the positive electrode active material, $Li_4Ti_5O_{12}$ coated $LiNi_{0.8}Co_{0.15}Al_{0.05}O_2$ was mixed with the sulfide solid electrolyte obtained in Example 13 or Comparative Example 1 in a ratio of 70:30 by weight to prepare a positive electrode material. 15 mg of the positive electrode material was put on the upper surface of the electrolyte layer, flattened so that the layer thickness of the positive electrolyte layer became uniform, and then, a pressure of 407 MPa was applied from the upper surface of the electrolyte layer by means of a hydraulic press machine, and pressure molding was conducted.

Graphite powder as a negative electrode active material and the sulfide solid electrolyte obtained in Example 13 or in Comparative Example 1 were mixed at a ratio of 60:40 by weight to obtain a negative electrode material. 12 mg of the negative electrode material was put to the side of the electrolyte layer opposite to the positive electrode layer, and flattened so that the layer thickness of the negative electrode layer became uniform, and then, a pressure of 555 MPa was applied from the upper surface of the negative electrode layer by means of a hydraulic press machine, and pressure molding was conducted. As a result, a lithium ion battery having a three-layer structure of the positive electrode, the solid electrolyte layer and the negative electrode was prepared.

(B) Rate Characteristics Test

The lithium ion battery produced in (A) above was allowed to stand in a thermostat set at 25° C. for 12 hours and then evaluated. At the first cycle, charging was conducted to 4.2V at 0.1 C (0.189 mA) and discharging was conducted to 3.1V at 0.1 C (0.189 mA), and at the second cycle to the tenth cycle, charging was conducted to 4.2V at 0.5 C (0.945 mA) and discharging was conducted to 3.1V at 0.5 C (0.945 mA). The capacity at the tenth cycle was measured. By using a separate battery produced with the same sample, the capacity at the tenth cycle was measured when charging and discharging were conducted from the one cycle to the tenth cycle at 0.1 C. The ratio of capacity when charging and discharging were conducted at 0.5 C and the capacity when charging and discharging were conducted at 0.1 C was taken as the evaluation value of the rate characteristics. The rate characteristics of the lithium ion battery obtained by using the sulfide solid electrolyte of Example 13 was 73%. The rate characteristics in the lithium ion battery obtained by using the sulfide solid electrolyte of Comparative Example 1 was 50%.

Evaluation Example

The sulfide solid electrolyte obtained in Example 1 was subjected to structural analysis using synchrotron radiation and neutron. Specifically, X-ray diffraction using synchrotron radiation was conducted on BL19B2 of SPring-8. The sample sealed in the glass capillary was measured. Measured data was corrected by using a $CeO_2$ standard sample. A Rietveld analysis was conducted based on the structural model of the argyrodite crystals. Neutron diffraction was measured at BL 20 of J-PARC. In the neutron diffraction, the occupation ratio of each site which was distinguished from S and Cl of 4a and 4d sites by the Rietveld structure analysis can be calculated. From the structural model that satisfies both the synchrotron radiation X-ray diffraction data and the neutron diffraction data, the occupation ratio, that is, the abundance ratio of the 4a and 4d sites was calculated.

Figure 6:
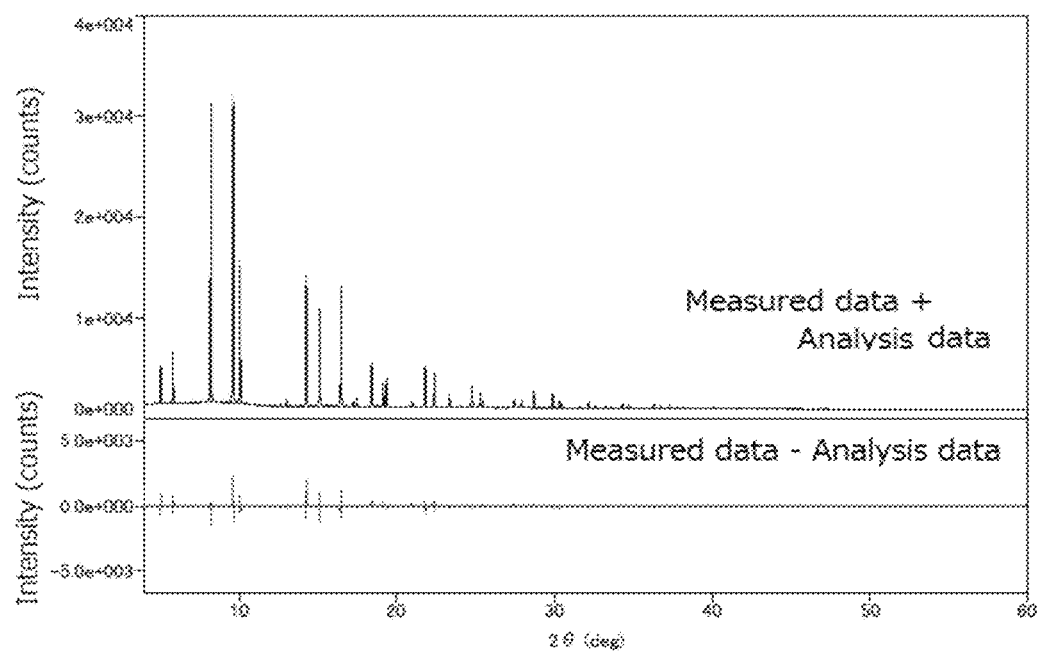
FIG. 6 show the results of the structural analysis by the synchrotron radiation of the sulfide solid electrolyte obtained in Example 1.

FIG. 6 shows the results of the structural analysis by synchrotron radiation. It can be confirmed that the difference between the actually measured data and the analysis data is small, and conformity of fitting is high. As a result of the analysis, as for the site selectivity of a halogen, it can be confirmed that chloride (Cl) tends to occupy the 4d site and bromine (Br) tends to occupy the 4a site.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A sulfide solid electrolyte, comprising lithium, phosphorus, sulfur, chlorine and bromine, wherein
in powder X-ray diffraction analysis using CuKα rays, the sulfide solid electrolyte has a diffraction peak A at 2θ=25.2±0.5 deg and a diffraction peak B at 2θ=29.7±0.5 deg,
the diffraction peak A and the diffraction peak B satisfy formula (A), and
a molar ratio of the chlorine to the phosphorus, c (Cl/P), and a molar ratio of the bromine to the phosphorus, d (Br/P), satisfy formula (1):

$$1.2 < c+d < 1.9 \quad (1)$$

$$0.845 < S_A/S_B < 1.200 \quad (A)$$

wherein $S_A$ is an area of the diffraction peak A and $S_B$ is an area of the diffraction peak B.

2. The sulfide solid electrolyte according to claim 1, wherein the molar ratio of the bromine to the phosphorus, d (B/P), is 0.15 or more and 1.6 or less.

3. The sulfide solid electrolyte according to claim 1, wherein the molar ratio of the chlorine to the phosphorus, c (Cl/P), and the molar ratio of the bromine to the phosphorus, d (Br/P), satisfy formula (2):

$$0.08 < d/(c+d) < 0.8 \quad (2).$$

4. The sulfide solid electrolyte according to claim 1, wherein a molar ratio of the lithium to the phosphorus, a (Li/P), a molar ratio of the sulfur to the phosphorus, b (S/P), the molar ratio of the chlorine to the phosphorus, c (Cl/P), and the molar ratio of the bromine to the phosphorus, d (Br/P), satisfy formulas (3) to (5):

$$5.0 \leq a \leq 7.5 \quad (3)$$

$$6.5 \leq a+c+d \leq 7.5 \quad (4)$$

$$0.5 \leq a-b \leq 1.5 \quad (5)$$

with the proviso that b>0, c>0 and d>0.

5. The sulfide solid electrolyte according to claim 1, wherein, in powder X-ray diffraction analysis using CuKα rays, the sulfide solid electrolyte does not have a diffraction peak derived from lithium halide or, if the sulfide solid electrolyte has a diffraction peak derived from lithium halide, said diffraction peak satisfies formula (B):

$$0 < I_C/I_A < 0.08 \qquad (B)$$

wherein $I_C$ is an intensity of a diffraction peak of lithium halide, and $I_A$ is an intensity of a diffraction peak at $2\theta = 25.2 \pm 0.5$ deg.

6. The sulfide solid electrolyte according to claim 1, wherein, in powder X-ray diffraction analysis using CuKα rays, the sulfide solid electrolyte does not have a diffraction peak at $2\theta = 14.4 \pm 0.5$ deg and $33.8 \pm 0.5$ deg or, if the sulfide solid electrolyte has a diffraction peak at $2\theta = 14.4 \pm 0.5$ deg and $33.8 \pm 0.5$ deg, said diffraction peak satisfies formula (C):

$$0 < I_D/I_A < 0.09 \qquad (C)$$

wherein $I_D$ is an intensity of a diffraction peak at $2\theta = 14.4 \pm 0.5$ deg and $I_A$ is an intensity of a diffraction peak at $2\theta = 25.2 \pm 0.5$ deg.

7. The sulfide solid electrolyte according to claim 1, wherein the sulfide solid electrolyte contains an argyrodite type crystal structure and a lattice constant of the argyrodite type crystal structure is 9.800 Å or more and 9.920 Å or less.

8. The sulfide solid electrolyte according to claim 1, wherein:
the molar ratio of the bromine to the phosphorus, d (B/P), is 0.15 or more and 1.6 or less; and
the molar ratio of the chlorine to the phosphorus, c (Cl/P), and the molar ratio of the bromine to the phosphorus, d (Br/P), satisfy formula (2):

$$0.08 < d/(c+d) < 0.8 \qquad (2).$$

9. The sulfide solid electrolyte according to claim 1, wherein:
the molar ratio of the bromine to the phosphorus, d (B/P), is 0.15 or more and 1.6 or less; and
a molar ratio of the lithium to the phosphorus, a (Li/P), a molar ratio of the sulfur to the phosphorus, b (S/P), the molar ratio of the chlorine to the phosphorus, c (Cl/P), and the molar ratio of the bromine to the phosphorus, d (Br/P), satisfy formulas (3) to (5):

$$5.0 \leq a \leq 7.5 \qquad (3)$$

$$6.5 \leq a+c+d \leq 7.5 \qquad (4)$$

$$0.5 \leq a-b \leq 1.5 \qquad (5)$$

with the proviso that b>0, c>0 and d>0.

10. The sulfide solid electrolyte according to claim 1, wherein:
the molar ratio of the chlorine to the phosphorus, c (Cl/P), and the molar ratio of the bromine to the phosphorus, d (Br/P), satisfy formula (2):

$$0.08 < d/(c+d) < 0.8 \qquad (2); \text{ and}$$

a molar ratio of the lithium to the phosphorus, a (Li/P), a molar ratio of the sulfur to the phosphorus, b (S/P), the molar ratio of the chlorine to the phosphorus, c (Cl/P), and the molar ratio of the bromine to the phosphorus, d (Br/P), satisfy formulas (3) to (5):

$$5.0 \leq a \leq 7.5 \qquad (3)$$

$$6.5 \leq a+c+d \leq 7.5 \qquad (4)$$

$$0.5 \leq a-b \leq 1.5 \qquad (5)$$

with the proviso that b>0, c>0 and d>0.

11. The sulfide solid electrolyte according to claim 1, wherein:
the molar ratio of the bromine to the phosphorus, d (B/P), is 0.15 or more and 1.6 or less; and
in powder X-ray diffraction analysis using CuKα rays, the sulfide solid electrolyte does not have a diffraction peak derived from lithium halide or, if the sulfide solid electrolyte has a diffraction peak derived from lithium halide, said diffraction peak satisfies formula (B):

$$0 < I_C/I_A < 0.08 \qquad (B)$$

wherein $I_C$ is an intensity of a diffraction peak of lithium halide, and $I_A$ is an intensity of a diffraction peak at $2\theta = 25.2 \pm 0.5$ deg.

12. The sulfide solid electrolyte according to claim 1, wherein:
the molar ratio of the chlorine to the phosphorus, c (Cl/P), and the molar ratio of the bromine to the phosphorus, d (Br/P), satisfy formula (2):

$$0.08 < d/(c+d) < 0.8 \qquad (2); \text{ and}$$

in powder X-ray diffraction analysis using CuKα rays, the sulfide solid electrolyte does not have a diffraction peak derived from lithium halide or, if the sulfide solid electrolyte has a diffraction peak derived from lithium halide, said diffraction peak satisfies formula (B):

$$0 < I_C/I_A < 0.08 \qquad (B)$$

wherein $I_C$ is an intensity of a diffraction peak of lithium halide, and $I_A$ is an intensity of a diffraction peak at $2\theta = 25.2 \pm 0.5$ deg.

13. The sulfide solid electrolyte according to claim 1, wherein:
the molar ratio of the bromine to the phosphorus, d (B/P), is 0.15 or more and 1.6 or less; and
in powder X-ray diffraction analysis using CuKα rays, the sulfide solid electrolyte does not have a diffraction peak at $2\theta = 14.4 \pm 0.5$ deg and $33.8 \pm 0.5$ deg or, if the sulfide solid electrolyte has a diffraction peak at $2\theta = 14.4 \pm 0.5$ deg and $33.8 \pm 0.5$ deg, said diffraction peak satisfies formula (C):

$$0 < I_D/I_A < 0.09 \qquad (C)$$

wherein $I_D$ is an intensity of a diffraction peak at $2\theta = 14.4 \pm 0.5$ deg and $I_A$ is an intensity of a diffraction peak at $2\theta = 25.2 \pm 0.5$ deg.

14. The sulfide solid electrolyte according to claim 1, wherein:
the molar ratio of the chlorine to the phosphorus, c (Cl/P), and the molar ratio of the bromine to the phosphorus, d (Br/P), satisfy formula (2):

$$0.08 < d/(c+d) < 0.8 \qquad (2); \text{ and}$$

in powder X-ray diffraction analysis using CuKα rays, the sulfide solid electrolyte does not have a diffraction peak at $2\theta = 14.4 \pm 0.5$ deg and $33.8 \pm 0.5$ deg or, if the sulfide solid electrolyte has a diffraction peak at $2\theta = 14.4 \pm 0.5$ deg and $33.8 \pm 0.5$ deg, said diffraction peak satisfies formula (C):

$$0 < I_D/I_A < 0.09 \qquad (C)$$

wherein $I_D$ is an intensity of a diffraction peak at $2\theta = 14.4 \pm 0.5$ deg and $I_A$ is an intensity of a diffraction peak at $2\theta = 25.2 \pm 0.5$ deg.

15. The sulfide solid electrolyte according to claim 1, wherein:
in powder X-ray diffraction analysis using CuKα rays, the sulfide solid electrolyte does not have a diffraction peak derived from lithium halide or, if the sulfide solid electrolyte has a diffraction peak derived from lithium halide, said diffraction peak satisfies formula (B):

$$0 < I_C/I_A < 0.08 \tag{B}$$

wherein $I_C$ is an intensity of a diffraction peak of lithium halide, and $I_A$ is an intensity of a diffraction peak at $2\theta=25.2\pm0.5$ deg; and in powder X-ray diffraction analysis using CuKα rays, the sulfide solid electrolyte does not have a diffraction peak at $2\theta=14.4\pm0.5$ deg and $33.8\pm0.5$ deg or, if the sulfide solid electrolyte has a diffraction peak at $2\theta=14.4\pm0.5$ deg and $33.8\pm0.5$ deg, said diffraction peak satisfies formula (C):

$$0 < I_D/I_A < 0.09 \tag{C}$$

wherein $I_D$ is an intensity of a diffraction peak at $2\theta=14.4\pm0.5$ deg and $I_A$ is an intensity of a diffraction peak at $2\theta=25.2\pm0.5$ deg.

16. The sulfide solid electrolyte according to claim 1, produced by a process comprising:
    applying a mechanical stress to raw materials to obtain an intermediate containing a glass component; and
    heat-treating the intermediate.

17. The sulfide solid electrolyte according to claim 1, produced by a process comprising:
    applying a mechanical stress to raw materials to obtain an intermediate containing a glass component; and
    heat-treating the intermediate at a temperature of 350 to 480° C. in an inert gas atmosphere.

18. An electrode mix, comprising: the sulfide solid electrolyte according to claim 1; and an active material.

19. A lithium ion battery, comprising the electrode mix according to claim 18.

20. A lithium ion battery, comprising the sulfide solid electrolyte according to claim 1.

* * * * *